(12) United States Patent
Suzuki et al.

(10) Patent No.: US 8,014,041 B2
(45) Date of Patent: Sep. 6, 2011

(54) OPTICAL SCANNING APPARATUS AND IMAGE FORMING APPARATUS

(75) Inventors: Mitsuo Suzuki, Kawasaki (JP); Shigeaki Imai, Zama (JP)

(73) Assignee: Ricoh Company, Ltd., Tokyo (JP)

( * ) Notice: Subject to any disclaimer, the term of this patent is extended or adjusted under 35 U.S.C. 154(b) by 1026 days.

(21) Appl. No.: 11/855,883

(22) Filed: Sep. 14, 2007

(65) Prior Publication Data

US 2008/0068678 A1 Mar. 20, 2008

(30) Foreign Application Priority Data

Sep. 15, 2006 (JP) ................................. 2006-250679

(51) Int. Cl.
*H04N 1/04* (2006.01)
(52) U.S. Cl. ........ 358/474; 358/475; 358/487; 358/480; 358/481; 359/206; 347/225; 347/233
(58) Field of Classification Search .................. 358/481, 358/480, 401, 487, 475, 509, 474, 409, 494, 358/482; 359/204, 205, 206, 207; 347/229, 347/231, 233, 234, 235, 225
See application file for complete search history.

(56) References Cited

U.S. PATENT DOCUMENTS

| | | | | |
|---|---|---|---|---|
| 3,972,584 A * | 8/1976 | Lobb | .............................. | 359/433 |
| 4,720,632 A * | 1/1988 | Kaneko | .......................... | 250/235 |
| 4,829,175 A * | 5/1989 | Goto et al. | ..................... | 250/236 |
| 5,245,181 A * | 9/1993 | Cho | .............................. | 250/236 |
| 5,377,038 A * | 12/1994 | Uzuki et al. | ............... | 359/205.1 |
| 5,581,391 A * | 12/1996 | Uzuki et al. | ................ | 359/205.1 |
| 5,933,266 A * | 8/1999 | Minakuchi | ................. | 359/196.1 |
| 5,952,650 A * | 9/1999 | Uzuki | ........................... | 250/235 |
| 5,995,246 A * | 11/1999 | Komiya et al. | ............... | 358/481 |
| 6,108,501 A * | 8/2000 | Nagai | ........................... | 399/116 |
| 6,160,610 A * | 12/2000 | Toda | ............................... | 355/41 |
| 6,580,186 B1 * | 6/2003 | Suzuki et al. | .................... | 310/51 |
| 6,778,203 B2 | 8/2004 | Itami et al. | | |
| 6,813,051 B2 | 11/2004 | Suzuki et al. | | |
| 6,822,775 B2 | 11/2004 | Suzuki et al. | | |
| 7,045,773 B2 | 5/2006 | Suzuki et al. | | |
| 7,050,082 B2 * | 5/2006 | Suzuki et al. | ................. | 347/241 |

(Continued)

FOREIGN PATENT DOCUMENTS

JP 2003-337294 11/2003

(Continued)

*Primary Examiner* — Negussie Worku
(74) *Attorney, Agent, or Firm* — Dickstein Shapiro LLP

(57) ABSTRACT

An optical scanning apparatus which includes: a light source unit which emits a light beam; a deflection scanning device which deflects the light beam emitted from the light source unit; an optical scanning unit having a scanning imaging lens and which scans a surface to be scanned; and a light beam detector which detects a position in a sub-scanning direction of the light beam, and is disposed in a position maintaining a correlation, in a time-varying characteristic, between an amount of change of a position in the sub-scanning direction of the light beam on the surface to be scanned and an amount of change of a position in the sub-scanning direction of the light beam detected by the light beam detector, in which a difference between the amount of change of the position in the sub-scanning direction of the light beam on the surface to be scanned and the amount of change of the position in the sub-scanning direction of the light beam detected by the light beam detector is equal to or less than a set value.

20 Claims, 10 Drawing Sheets

U.S. PATENT DOCUMENTS

| | | |
|---|---|---|
| 7,167,288 B2 | 1/2007 | Miyatake et al. |
| 7,471,307 B2 * | 12/2008 | Iwamoto .................. 347/234 |
| 7,623,147 B2 * | 11/2009 | Kato ....................... 347/235 |
| 2002/0018250 A1 * | 2/2002 | Kato ....................... 358/481 |
| 2002/0030725 A1 * | 3/2002 | Okugawa et al. ............ 347/116 |
| 2004/0240000 A1 | 12/2004 | Miyatake et al. |
| 2005/0094234 A1 | 5/2005 | Miyatake et al. |
| 2005/0179971 A1 | 8/2005 | Amada et al. |
| 2005/0190420 A1 | 9/2005 | Imai et al. |
| 2006/0158711 A1 | 7/2006 | Imai et al. |
| 2006/0209166 A1 | 9/2006 | Suzuki et al. |
| 2007/0058255 A1 | 3/2007 | Imai et al. |
| 2007/0146849 A1 | 6/2007 | Miyatake et al. |
| 2007/0236557 A1 | 10/2007 | Imai et al. |
| 2009/0021759 A1 * | 1/2009 | Yokoi ....................... 358/1.13 |
| 2009/0153641 A1 * | 6/2009 | Toyama et al. ............ 347/231 |

FOREIGN PATENT DOCUMENTS

JP    2005-037575    2/2005

* cited by examiner

OPTICAL SCANNING APPARATUS AND IMAGE FORMING APPARATUS

CROSS REFERENCE TO RELATED APPLICATION

The present application is based on and claims priority from Japanese Application Number 2006-250679, filed Sep. 15, 2006, the disclosure of which is hereby incorporated by reference herein in its entirety.

BACKGROUND

The present invention relates to an optical scanning apparatus which defectively scans a light beam, and an image forming apparatus mounted with the optical scanning apparatus.

As a color image forming apparatus such as a color laser printer, there is known a color image forming apparatus of a tandem type, which obtains a color image by writing, with a plurality of optical scanning devices by the use of laser beams, respectively, a plurality of pieces of information each having a color different from each other onto a plurality of photoreceptors, each of which is driven to be rotated, to form electrostatic latent images, developing the electrostatic latent images into developed images having different colors with a plurality of developing devices, respectively, and overlapping the developed images onto a transfer body to transfer the developed images thereon.

The optical scanning devices emit laser beams from semiconductor lasers which are controlled to be driven in accordance with retrieved image information signals of respective colors, respectively. Each of the laser beams is condensed, through optical components such as a polygon mirror, a lens and so forth, onto a surface of the corresponding photoreceptor which is uniformly charged, and scanned in a main-scanning direction. Thereby, the surfaces of the respective photoreceptors are written with image signals by scanning-beams, and hence, the electrostatic latent images are formed.

In an optical scanning apparatus used in the tandem color image forming apparatus, a color shift due to a registration position gap or to a misregistration in a sub-scanning direction is generated when timings of writing the electrostatic latent images, formed on the photoreceptors, are not accurately matched with each other for the respective colors.

In addition, the color shift is generated thus degrading the quality of an image when there is a difference in gradients, bending or the like of scanning lines of the laser beams in the plural optical scanning apparatuses provided corresponding to the respective colors.

Furthermore, the optical components are so disposed that the laser beams, going toward the corresponding photoreceptors, travel along pathways which are different from each other, respectively. Accordingly, there is a problem in that a scanning imaging lens, for example, is deformed by heat due to influences such as environmental temperature in which the color image forming apparatus is placed, rise in temperature within the apparatus, and so on, and thus, positions of the laser beams tend to vary easily. This phenomenon is notable when the lens is made of a resin.

In order to cope with such a shift in the scanning position, a correction is performed by detecting a detection pattern of the registration position gap, recorded on the transfer body, periodically, for example, at a time of start-up of the apparatus, between jobs and so on. However, there is also a problem in that the color shift gradually increases when the number of printed sheets for one job is large, since the scanning position further varies by generation of heat of a fixing device, a polygon motor and so forth, in accordance with a continuous printing operation.

To solve the above problems, various inventions have been proposed. For example, Japanese patent application publication No. 2003-337294 discloses an optical scanning apparatus and an image forming apparatus mounted with the optical scanning apparatus. The disclosed optical scanning apparatus includes a mechanism for adjusting scanning speed uniformly, and a mechanism for adjusting the inclination of scanning lines of laser beams. The scanning speed uniformity adjusting mechanism displaces reflecting mirrors, which guide laser beams corresponding to respective colors to photoreceptors, perpendicularly to a main-scanning corresponding direction and around an axis parallel with reflection surfaces of the mirrors, so as to adjust the scanning speed of the laser beams uniformly. The scanning line inclination adjusting mechanism displaces optical elements, which correct positions of the scanning lines of the laser beams in a sub-scanning corresponding direction, perpendicularly to the main-scanning corresponding direction and around an axis perpendicular to the sub-scanning corresponding direction. The disclosed optical scanning apparatus adjusts uniformity of the scanning speed with high precision, and is thus capable of obtaining an image that is excellent in absolute positional accuracy.

However, the invention disclosed in No. 2003-337294A detects positions in the sub-scanning direction of the laser beams by detecting toner marks on an intermediate transfer belt. Accordingly, there are problems in that not only can the detection not be performed constantly, including a case in which an image is being outputted, but also an accuracy of the detection, for example, line width varies, quality of an toner image tends to be varied due to humidity, etc., is low. Further problem is that a toner for the marks is consumed uneconomically for each detection.

Japanese patent application publication No. 2005-37575 also discloses an optical scanning apparatus and a color image forming apparatus. In the disclosed optical scanning apparatus, laser beam detectors for detecting positions in a sub-scanning direction of laser beams are arranged, and light-receiving elements which detect the laser beams are separated in a main-scanning direction. In addition, side edges of light-receiving faces, adjacent to each other, of the separated light-receiving elements are arranged at an angle in the sub-scanning direction. According to this invention, the light-receiving elements are disposed adjacently parallel to the main-scanning direction, so that there is an advantage in that accuracy in detection in the sub-scanning direction is unlikely to be influenced even when an amount of light of the laser beams is changed.

The invention disclosed in Japanese patent application publication No. 2005-37575 detects scanning lines of the laser beams to correct the positions in the sub-scanning direction of the scanning lines based on a result of the detection. However, since the laser beam detectors disclosed in No. 2005-37575A are not disposed at locations having a correlation with the laser beams which scan surfaces to be scanned, optimization of the positions at which the laser beam detectors are disposed has not been achieved. Thus, there is a possibility in No. 2005-37575A that the result of the detection of the positions in the sub-scanning direction of the laser beams detected by the laser beam detectors becomes different from the positions in the sub-scanning direction of the laser beams on the surfaces to be scanned, and thereby, the correction of the positions in the sub-scanning direction of the laser beams is erroneously performed. Therefore, it is likely that degradation of an image occurs, in contradiction to an improvement of quality of the image.

SUMMARY

At least one objective of the present invention is to provide an optical scanning apparatus capable of detecting a beam scanning position of a light beam, as typified by a laser beam, with high accuracy, and correcting a variation in a position in a sub-scanning direction of the light beam based on a result of the high accuracy detection, and an image forming apparatus mounted with the optical scanning apparatus so as to allow a high image quality to be produced.

To achieve these and other advantages and in accordance with the purpose of the invention, as embodied and broadly described herein, the invention provides an optical scanning apparatus, which includes: a light source unit which emits a light beam; a deflection scanning device which deflects the light beam emitted from the light source unit; an optical scanning unit having a scanning imaging lens and which scans a surface to be scanned; and a light beam detector which detects a position in a sub-scanning direction of the light beam, and is disposed in a position maintaining a correlation, in a time-varying characteristic, between an amount of change of a position in the sub-scanning direction of the light beam on the surface to be scanned and an amount of change of a position in the sub-scanning direction of the light beam detected by the light beam detector, in which a difference between the amount of change of the position in the sub-scanning direction of the light beam on the surface to be scanned and the amount of change of the position in the sub-scanning direction of the light beam detected by the light beam detector is equal to or less than a set value.

Advantageously, the difference, in the correlation, between the amount of change of the position in the sub-scanning direction of the light beam on the surface to be scanned and the amount of change of the position in the sub-scanning direction of the light beam detected by the light beam detector is equal to or less than a density of pixels in the sub-scanning direction.

Advantageously, the optical scanning apparatus further includes an optical housing provided with an attachment section to which the light beam detector is attached, and accommodating therein at least the deflection scanning device.

Advantageously, the optical housing further includes a fixing part to which a frame of an apparatus is mounted, and the attachment section is provided in the periphery of the fixing part.

Advantageously, the attachment section is provided behind the fixing part.

Advantageously, an amount of deformation of the attachment section due to a variation in operating temperature is set equal to or less than a density of pixels in the sub-scanning direction.

Advantageously, the variation in the operating temperature includes a rise in temperature in the optical housing due to driving of the deflection scanning device, and the amount of the deformation of the attachment section due to the rise in the temperature is set equal to or less than the density of pixels in the sub-scanning direction.

Advantageously, the light beam detector is disposed in an optical scanning region outside of an image region, and the light beam which scans the image region and a light-receiving element provided in the light beam detector travels through a same optical element.

Advantageously, the light beam detector is disposed on an optical path and within a distance from the surface to be scanned in which a diameter of a light beam spot ($1/e^2$ of a peak light amount) of the light beam, which images on the surface to be scanned, becomes 5 times or less.

Advantageously, the light beam detector includes a light-receiving element having a plurality of light-receiving surfaces which detect the light beam, the plurality of light-receiving surfaces is formed such that end edge parts thereof, which are adjacent in an area in which the light beam passes, are non-parallel mutually, and the plurality of light-receiving surfaces is electrically connected, mutually.

Advantageously, the light-receiving element in the light beam detector is scanned by the light beam having a constant amount of light.

Advantageously, the optical scanning apparatus further includes a controller which sequentially measures time intervals of pulse signals outputted from the light beam detector, sequentially stores the measured time intervals into a storing device, divides the time intervals stored in the storing device into two groups of the time intervals, and calculates the position in the sub-scanning direction of the light beam from an average value of the shorter group of time intervals separated.

Advantageously, the optical scanning apparatus further includes a drive circuit which drives a liquid crystal deflection element disposed in an optical path of the light scanning unit to correct the position in the sub-scanning direction of the light beam, based on the amount of change of the position in the sub-scanning direction of the light beam detected by the light beam detector.

Advantageously the optical scanning apparatus further includes a drive circuit which controls timing of light-emission of the light source unit to correct the position in the sub-scanning direction of the light beam, based on the amount of change of the position in the sub-scanning direction of the light beam detected by the light beam detector.

In addition, the invention provides another optical scanning apparatus, which includes: a light source unit which emits a light beam; a deflection scanning device which deflects the light beam emitted from the light source unit; an optical scanning unit having a scanning imaging lens and which scans a surface to be scanned; an optical housing having an inner surface and an outer surface, and provided with a fixing part to which a frame of an apparatus is mounted on the outer surface, the optical housing accommodating in a space surrounded by the inner surface of at least the deflection scanning device; and a light beam detector provided on the inner surface in the periphery of the fixing part away from the deflection scanning device, and which detects a position in a sub-scanning direction of the light beam.

Furthermore, the invention provides an image forming apparatus which forms a latent image on a photoreceptor having a surface to be scanned with optical scanning to obtain a desired recording image by visualizing the latent image, the image forming apparatus including an optical scanning apparatus, having: a light source unit which emits a light beam; a deflection scanning device which deflects the light beam emitted from the light source unit; an optical scanning unit having a scanning imaging lens and which scans the surface to be scanned; and a light beam detector which detects a position in a sub-scanning direction of the light beam, and is disposed in a position maintaining a correlation, in a time-varying characteristic, between an amount of change of a position in the sub-scanning direction of the light beam on the surface to be scanned and an amount of change of a position in the sub-scanning direction of the light beam detected by the light beam detector, in which a difference between the amount of change of the position in the sub-scanning direction of the light beam on the surface to be scanned and the amount of change of the position in the sub-scanning direction of the light beam detected by the light beam detector is equal to or less than a set value.

Advantageously, the light beam detector and the photoreceptor are fixed and supported by a same supporting member.

Advantageously, the supporting member includes: a single stay member; and a bracket member integrally fixed to the stay member and which extends from the stay member, and wherein a rotation shaft of the photoreceptor is fixed to the stay member, and the light beam detector is fixed to the bracket member, such that the difference between the amount of change of the position in the sub-scanning direction of the light beam on the surface to be scanned and the amount of change of the position in the sub-scanning direction of the light beam detected by the light beam detector is suppressed to be equal to or less than the density of pixels in the sub-scanning direction.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the specification, serve to explain the principles of the invention.

DETAILED DESCRIPTION

Figure 1:
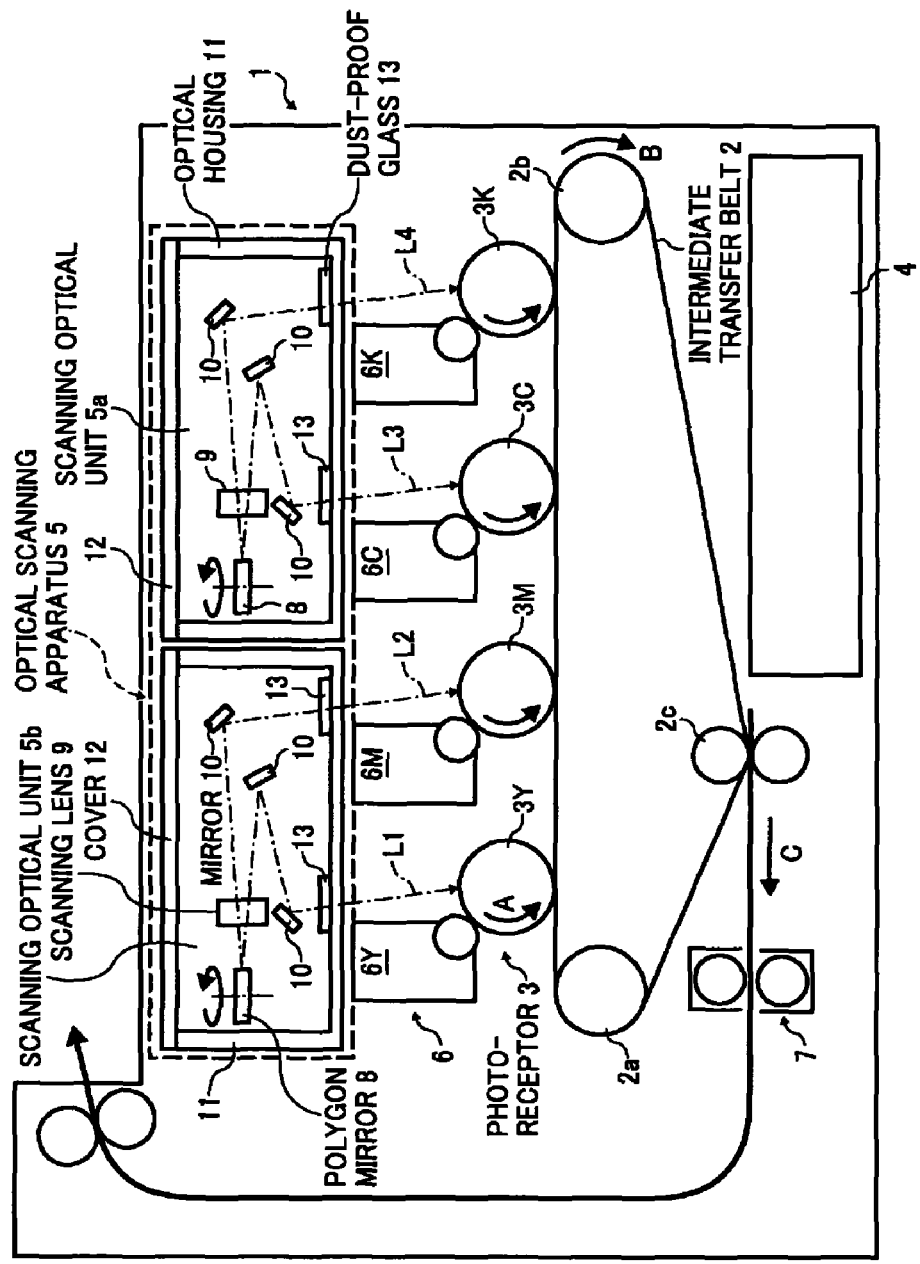
FIG. 1 illustrates a structure of an image forming apparatus mounted with an optical scanning apparatus according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

FIG. 1 illustrates a structure of an image forming apparatus mounted with an optical scanning apparatus according to a first embodiment of the present invention. The image forming apparatus 1 according to the present embodiment is a color image forming apparatus of a tandem type in which four photoreceptors or photoreceptor drums 3Y, 3M, 3C and 3K are juxtaposed relative to an intermediate transfer belt 2. Hereinafter, additional characters of Y, M, C, and K, representing Yellow, Magenta, Cyan, and black (Key tone) respectively, are given for reference numerals to distinguish respective portions corresponding to colors of Y: yellow, M: magenta, C: cyan, and K: black.

Referring to FIG. 1, an optical scanning apparatus 5, a developing device 6, a photoreceptor 3, the intermediate transfer belt 2, a fixing device 7, and a paper cassette 4 are disposed in an apparatus body in an order of their arrangement from top to bottom.

The photoreceptor 3 is structured of photoreceptor drums 3Y, 3M, 3C, and 3K which correspond to the respective colors. The photoreceptor drums 3Y, 3M, 3C, and 3K are arranged in an order of their arrangement from an upstream side of the intermediate transfer belt 2 at even intervals. Each of the photoreceptor drums 3Y, 3M, 3C, and 3K is formed to have a same diameter, and members are sequentially arranged in their surroundings according to an electrophotographic process. To explain the members with reference to the photoreceptor drum 3Y as an example, an electrification charger (not illustrated), a laser beam L1 based on an image signal and emitted from the optical scanning apparatus 5, a developing device 6Y, a transfer charger (not illustrated), and a cleaning device (not illustrated), and so on, are disposed sequentially. These members are also arranged for other photoreceptor drums 3M, 3C, and 3K. In the present embodiment, surfaces of the respective photoreceptor drums 3Y, 3M, 3C, and 3K are set as surfaces to be scanned, which are set for the respective colors, and the surfaces of the respective photoreceptor drums 3Y, 3M, 3C, and 3K are scanned by laser beams L1, L2, L3, and L4 emitted from the optical scanning apparatus 5, respectively.

The photoreceptor drum 3Y is evenly charged by the unillustrated electrification charger. The laser beam L1, which is emitted from the optical scanning apparatus 5 and shuttles in a main-scanning direction, is irradiated on the charged photoreceptor drum 3Y, such that an electrostatic latent image is formed on the photoreceptor drum 3Y. When forming the electrostatic latent image, the laser beam L1 is moved in a sub-scanning direction relatively in accordance with a rotation of the photoreceptor drum 3Y in a direction of an arrow A illustrated in FIG. 1. In addition, a position nearer to a downstream side of the rotation direction of the photoreceptor drum 3Y than an irradiation position of the laser beam L1 by the optical scanning apparatus 5 is disposed with the developing device 6Y which supplies a toner to the photoreceptor drum 3Y, by which the yellow toner is supplied. The toner supplied from the developing device 6Y is attached to a part of the photoreceptor drum 3Y to which the electrostatic latent image is formed, thereby forming a toner image. Similarly, the photoreceptor drums 3M, 3C, and 3K are formed with monochromatic M, Y, and K toner images, respectively. Here, the main-scanning direction means a direction parallel to a rotation central axis of the photoreceptor drum, and the sub-scanning direction means a direction perpendicular to the rotation central axis of the photoreceptor drum.

The intermediate transfer belt 2 is disposed so as to contact with lower surfaces of the respective photoreceptor drums 3Y, 3M, 3C, and 3K. The intermediate transfer belt 2 is twined around a plurality of rollers 2a, 2b, and 2c, and is moved and conveyed in a direction of an arrow B by driving of an unillustrated motor. By this conveying, the intermediate transfer belt 2 is moved in an order of the photoreceptors 3Y, 3M, 3C, and 3K while contacting thereto. The intermediate transfer belt 2 sequentially overlaps the respective monochromatic images developed by the photoreceptor drums 3Y, 3M, 3C, and 3K to transfer the monochromatic images thereon, such that a color image is formed on the intermediate transfer belt 2. Thereafter, a transfer paper is conveyed from the paper cassette 4 in a direction of an arrow C illustrated in FIG. 1, such that the color image on the intermediate transfer belt 2 is transferred on the transfer paper. The transfer paper, on which the color image is formed, is conveyed to the fixing device 7 to be applied with a fixing process, and is then discharged out of the apparatus as a color image paper.

The optical scanning apparatus 5 is structured of two scanning optical units 5a and 5b having the same components. Each of the scanning optical units 5a and 5b is provided, for example, with two light source units (not illustrated) which include semiconductor lasers corresponding to two colors, a polygon mirror 8 as a deflection scanning device, a scanning lens 9 including a plurality of fθ lenses, and a plurality of mirrors 10. The laser beams L1, L2, L3, and L4 emitted from the two light source units are respectively deflected and scanned with the same reflecting surfaces of the polygon mirrors 8 and 8. The laser beams L1, L2, L3, and L4 entering the reflecting surfaces of the polygon mirrors 8 and 8 each has a desired angle α relative to the sub-scanning direction, as a so-called oblique incident type. In one embodiment, the angle α is set to be equal to or less than 5 degrees, i.e., α=5 degrees or less.

Here, problems such as deterioration of an image, increase in windage loss, etc., are reduced when the laser beam from at least one of the two light source units has the desired angle α relative to the sub-scanning direction. More specifically, when the angle α is more than 5 degrees, a large degree of bending of scanning lines on the surfaces to be scanned is generated as well as a diameter of the laser beams becoming large, incurring the deterioration of the image as a result. On the other hand, when the two laser beams are perpendicular to and parallel with the reflecting surfaces, i.e., α=0, it is necessary to lengthen a height dimension in the sub-scanning direction of the polygon mirror 8 or to increase a thickness of the polygon mirror 8, which increases the windage loss at the time of a high-speed rotation of the polygon mirror 8.

In addition, scanning imaging optical systems, which include imaging lenses, optical path turning back mirrors and so forth and which guide the laser beams on the surfaces to be scanned of the four photoreceptor drums 3Y, 3M, 3C, and 3K, are also provided in four sets. In other words, two sets of the scanning imaging optical systems are provided for each of the scanning optical units 5a and 5b (two sets×2). The scanning optical units 5a and 5b are respectively stored in separate optical housings 11 and 11.

Each of the light source units is structured of the semiconductor laser as a light source, and a collimator lens which collimates the laser beam emitted from the semiconductor laser, although they are not illustrated, and is disposed and fixed in the optical housing 11. In addition, each of the optical housings 11 and 11 is provided with a cover 12. A lower part of the optical housing 11, or on a side of the photoreceptor drums in FIG. 1, is provided with openings for allowing the laser beams to pass therethrough. The openings are respectively attached with dust-proof glass 13 as laser transmission members. Thereby, each of the optical housings 11 and 11 is hermetically sealed, substantially.

In each of the scanning optical units 5a and 5b, the laser beams, in which image data is converted to signals for driving the light source units and emitted from the light source units in accordance with the light source unit driving signals, reach the polygon mirror 8 through un-illustrated cylindrical lenses for correction of plane tilts, and are deflected and scanned by deflection mirror face portions which are driven to be rotated by the polygon mirror 8. Thus, the laser beams corresponding to two colors are each deflected and scanned in one way on one side by the polygon mirror 8, and the deflected and scanned laser beams then pass through the scanning lenses 9. The laser beams having passed through the scanning lenses 9 are turned back by the mirrors 10 and 10, and are then irradiated through the dust-proof glasses 13 as the laser transmission members on the surfaces to be scanned of the respective photoreceptor drums 3Y, 3M, 3C, and 3K, such that the electrostatic latent images are written thereto.

In the present embodiment, at least the scanning lenses 9 are fixed to the optical housings 11 by adhesion. In particular, it is preferable that only a central part in the main-scanning direction on a side of a contacting surface of each of the scanning lenses 9 be adhered. A reason that the adhesion with the central part of the scanning lens 9 is preferable is that, when the lens deforms to become enlarged by thermal expansion, the lens broadens toward both ends thereof based on the central part, and hence, the lens expands freely to temperature and irregular deformation in the main-scanning direction is reduced, and consequently, localized and large deterioration of a magnification error in the main-scanning direction of the lens is possible to be avoided. In this regard, the fixing of the scanning lens 9 makes it possible to avoid the localized deterioration of the magnification error in the main-scanning direction, while employing the fixing by adhesion makes it possible to achieve inexpensive production costs by curtailment of the number of components and simplification of a fixing process.

A direction of rotation of the two polygon mirrors 8 and 8 illustrated in FIG. 1 is set to be the same for each other, for example, in a clockwise or anti-clockwise direction, such that the scanning direction becomes the same in direction. In the present embodiment, the two polygon mirrors 8 and 8 rotate in the anti-clockwise direction.

The optical housing 11 is preferably made of a metal having high heat conductivity, and in particular, it is preferred that a material of the optical housing 11 have a coefficient of thermal expansion close to that of the scanning lens 9. Accordingly, it is possible to reduce the irregular deformation of the lens as much as possible by making a difference in the coefficient of thermal expansion of the optical housing 11 and the scanning lens 9 small.

More specifically, zinc, magnesium, aluminum, or equivalents, or an alloy selected from a group including those is preferred for the optical housing 11 when a polycarbonate resin is employed for the scanning lens 9, and among those, zinc is most preferred, since a combination in which the difference in the coefficient of thermal expansion is smallest is obtained.

Table 1 indicates representative values of materials of each part.

TABLE 1

| Parts | Materials | Coefficient of thermal expansion [/° C.] |
|---|---|---|
| Scanning lens | Silica glass | $0.5 \times 10^{-5}$ |
| | Polycarbonate resin | $7.0 \times 10^{-5}$ |
| Optical housing | Zinc | $4.0 \times 10^{-5}$ |
| | Magnesium | $2.6 \times 10^{-5}$ |
| | Aluminum | $2.4 \times 10^{-5}$ |

The scanning lens 9 according to the present embodiment is made of a resin for example, so that, although an aspherical surface configuration thereof is possible to be formed easily by resin molding, changes in a refractive index and a shape and so on by an influence of increased temperature appear prominently as compared with a silica glass. Therefore, in the present embodiment, an upper temperature limit of the scanning lenses 9 corresponding to all of the colors is set to be equal to or less than 45° C., and temperature distribution in the main-scanning direction is set to be equal to or less than 2° C., for example. As a result, a shift of a position of a beam spot, the diameter of the beam, bending of the scanning line, and so on are suppressed, and thereby, a high-quality image is achieved. In addition, when the temperature distribution of equal to or less than 2° C. in the main-scanning direction is employed, not only does a temperature difference in the temperature distribution within one color become small, but also a relative temperature difference in the temperature distribution among each color becomes small, and thus, a favorable effect for reduction of a color shift is obtained.

According to the present embodiment, a drive circuit which is unillustrated for controlling a rotation speed and a rotation phase of the two polygon mirrors 8 and 8 is provided. In the drive circuit according to the present embodiment, separate driving circuits, which each includes a PLL (Phase-Locked Loop) circuit part for controlling the rotation speed at a constant rate according to an external reference clock and a driver part for supplying electric current to a motor, and which have typically been provided for each of the polygon mirrors 8 and 8, is integrated, so as to aggregate substrates, power-source systems, and noise-filter functions. In addition, the rotation phases of the polygon mirrors 8 and 8 are detected by the use of rotor magnets, respectively, and the rotation phase relative to the rotation reference clock of one of the polygon mirrors 8 and 8 is adjusted, such that the polygon mirrors 8 and 8 are controlled to have a desired phase relationship.

The timing of scanning the four color laser beams L1, L2, L3, and L4 in the two polygon mirrors 8 and 8 is, for example, based on previously-determined timing for transferring the toner on the intermediate transfer belt 2, which moves between the photoreceptor drums 3Y, 3M, 3C, and 3K, as a reference. The desired phase relationship of the two polygon mirrors 8 and 8 means, for example, such a relationship of phase of the two polygon mirrors 8 and 8 in which the scanning of each of the four color laser beams L1, L2, L3, and L4 is possible to be initiated according to the reference timing. For example, when the two polygon mirrors 8 and 8 are rotated without controlling their phases, a phase shift for a maximum of one face of the polygon mirror 8 is generated, since the reflecting surfaces of the polygon mirrors 8 and 8 have the arbitrary phase relationship, causing the color shift in the sub-scanning direction. More specifically, an interval of beams in the sub-scanning direction by the phase shift, in other words a density of pixels in the sub-scanning direction, becomes 42.3 μm, 21.2 μm, and 10.6 μm when recording densities are 600 dpi, 1200 dpi, and 2400 dpi, respectively. Therefore, when the number of the laser beams in one of the scanning optical units 5a and 5b is plural, the beam interval in the sub-scanning direction caused by the phase shift corresponds to a value in which a value of the beam interval, i.e., the pixel density, is multiplied by the number of laser beams (the number of laser beams is two in the present embodiment).

When the drive circuits for controlling the rotation phases of the polygon mirrors 8 and 8 are integrated as described above, improvement of noise-resistance as well as connection of a wiring pattern, a motor harness and so on at the shortest distance are possible, by which a reduction of electromagnetic wave noise is possible. In addition, miniaturization of a substrate, and a reduction of costs by curtailment of the number of components are also achieved.

Figure 2:
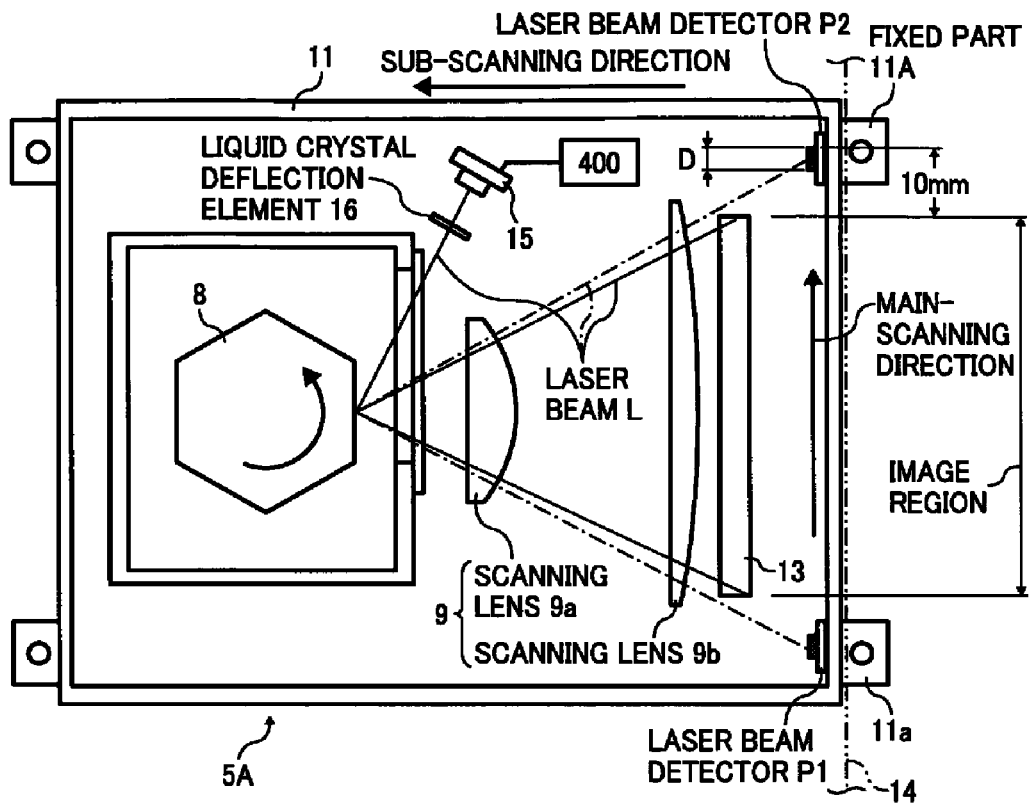
FIG. 2 illustrates a structure of an essential part of one of scanning optical units, seen from a plane side, according to the first embodiment.

FIG. 2 illustrates a structure of an essential part of one of the scanning optical units, seen from a plane side, according to the first embodiment. In the scanning optical unit 5a, the laser beam L emitted from the light source unit 15 transmits through a liquid crystal deflection element 16 to enter the polygon mirror 8 as the deflection scanning device. The laser beam L reflected by the rotation of the polygon mirror 8 transmits the scanning lenses 9a and 9b, and is then deflectively scanned in a scanning direction. In the present embodiment, laser beam detectors P1 and P2 are disposed at both ends in the main-scanning direction of an image region. A position in the sub-scanning direction of the laser beam L is detectable by scanning of light-receiving elements in the laser beam detectors P1 and P2 with the laser beam L, which will be described later in detail.

A reason that the laser beam detectors P1 and P2 are arranged in the positions located in the both ends in the main-scanning direction is that an error may be generated in the detection of the change in the position in the sub-scanning direction when the laser beam detector is disposed only on one side, in a case in which, for example, the inclination of the scanning line of the laser beam L is changed according to the rise in temperature, and accordingly, the change due to the inclination of the scanning line needs to be cancelled by disposing the laser beam detectors P1 and P2 in the both ends. According to the present embodiment, for example, it is determined that the inclination of the scanning line is changed when there is a difference in an amount of change in the position in the sub-scanning direction between the laser beam detectors P1 and P2. Then, a value of the sum of the amount of change of the laser beam detector P1 and the amount of change of the laser beam detector P2 is calculated to be half, and the calculated value, which is half of the value of the sum, is worked out or defined as a result of the detection as the amount of change of the position in the sub-scanning direction of the scanning line.

Here, only one of the laser beam detector P1 may be used when there is no change in the inclination of the scanning line of the laser beam L described above, or when the change in the inclination of the scanning line of the laser beam L is extremely small, for example, equal to or less than the density of the pixels in the sub-scanning direction. The laser beam detector P1 may be disposed in an upstream side of the scanning, i.e., the location of P1, to be used also as a detector for supplying a horizontal synchronization signal for determining the timing of writing an image in the main-scanning direction, which is advantageous as compared with the position of the other laser beam detector P2. In other words, the image region is set to be narrower than an area of the detection of the laser beam in the main-scanning direction as illustrated in FIG. 2. Thus, a signal indicating an input of the laser beam, or the synchronization signal, is detected by the laser beam detector P1, and thereafter, the writing of the image is initiated after elapse of a predetermined time, to determine the timing of writing the image.

When the temperature rises due to generation of heat by the polygon mirror 8, which rotates at a high speed of more than 30,000 rpm for example, the temperature in the optical housing 11 also rises by heat transfer, radiant heat, and so on.

A temperature distribution, in which the temperature becomes lower as a distance from the light deflector is increased, is generated around the polygon mirror 8 as a source of the heat generation as a center, and thus the optical housing 11 deforms along the temperature distribution. An amount of deformation of the optical housing 11 is largest in a part where the polygon mirror 8 is fixed, and the amount of deformation becomes less as it moves away therefrom. In the housing 11, the amount of deformation becomes smallest in fixed parts 11a and 11a which are to be attached to a frame 14 of the image forming apparatus, since the fixed parts 11a and 11a are fixed to the frame 14 having high machine stiffness and thus, the fixed parts 11a and 11a among respective parts of the housing 11 are most difficult to deform. In the present embodiment, the amount of deformation in the fixed parts 11a and 11a is suppressed to be equal to or less than the density of pixels in the sub-scanning direction, wherein a direction of the amount of deformation is a component of the deformation amount in the sub-scanning direction.

Accordingly, such a deformation in which the amount of deformation becomes largest in the part of the polygon mirror 8, which is farthest away from the fixing parts 11a and 11a, and the amount of deformation becomes smallest in the fixing parts 11a and 11a, is generated in the housing 11.

Each of the laser beam detectors P1 and P2 is disposed at a location in the housing 11 so that it is possible to detect the amount of change of the position in the sub-scanning direction by the laser beam L on the surface to be scanned with high accuracy. Therefore, each of the laser beam detectors P1 and P2 is disposed at a position which is difficult to be influenced by the deformation of the optical housing 11 even when the housing 11 is deformed by the generation of temperature variation, and is disposed at the position in which a correlation of the amount of change of the position in the sub-scanning direction of the surface to be scanned and the amount of change in the position in the sub-scanning direction detected by the laser beam detector is maintained. More particularly, each of the laser beam detectors P1 and P2 is disposed in the location in which the deformation of the optical housing 11 becomes smallest even at the time of the variation of temperature. In the present embodiment, the location is behind or at a position on a back surface part of the fixing part 11a of the optical housing 11, which is in the periphery of the location of attachment to the frame 14 of the image forming apparatus.

Figure 3:
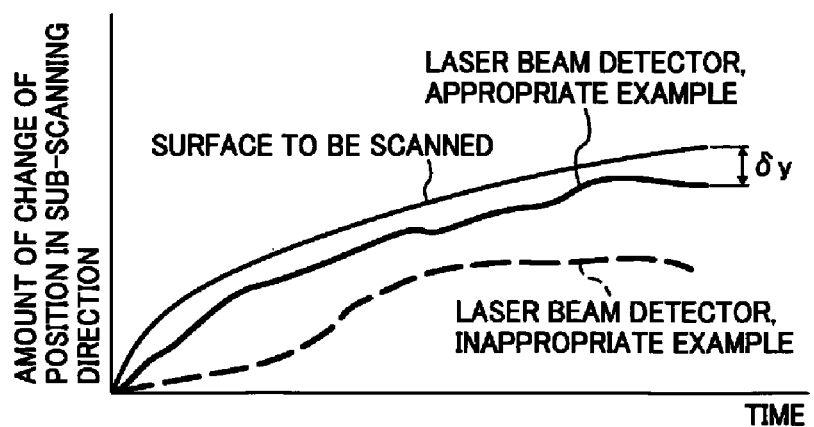
FIG. 3 is a diagram illustrating a correlation between an amount of change in a position in a sub-scanning direction of a surface to be scanned and an amount of change in a position in the sub-scanning direction detected by laser beam detectors according to the first embodiment.

FIG. 3 illustrates the correlation of the amount of change of the position in the sub-scanning direction on the surface to be scanned and the amount of change of the position in the sub-scanning direction detected by the laser beam detectors. The temperature rises according to elapse of time (represented by a horizontal axis) when the polygon mirror 8 initiates its rotation such that optical scanning, image formation and so on are performed. Thereby, the irregular deformation of the scanning lens 9 is generated, and a posture of attachment of optical elements such as the light source unit and the reflecting mirror changes with the deformation of the optical housing 11. Hence, the position in the sub-scanning direction of the surface to be scanned is changed as illustrated in FIG. 3, and consequently, a registration position or the writing position in the sub-scanning direction is varied. Not only due to the irregular deformation described above for example, but also since the posture of attachment of the optical elements varies according to each color, for example, by variation in manufacturing of the elements, variation at the time of assembling and so on, the color shift appears at the time of color-image formation in which a plurality of colors is overlapped.

On the other hand, according to the present embodiment, the laser beam detectors P1 and P2 each performs the detection of the amount of change of the position in the sub-scanning direction while maintaining the correlation with the amount of change of the position in the sub-scanning direction on the surface to be scanned. Here, maintaining of the correlation means, for example, to maintain a state in which a difference by of the amount of change of the position in the sub-scanning direction on the surface to be scanned and the amount of change of the position in the sub-scanning direction detected by the laser beam detectors P1 and P2 is equal to or less than the density of pixels in the sub-scanning direction, as illustrated in FIG. 3. Preferably, the difference $\delta y$ is equal to or less than ½ of the density of pixels in the sub-scanning direction. For example, the difference $\delta y$ in the amounts of changes in the sub-scanning direction is equal to or less than 21 μm, preferably equal to or less than 11 μm, when the recording density or the density of the pixels in the sub-scanning direction is 1200 dpi, and the difference is equal to or less than 42 μm, preferably equal to or less than 21 μm, when the recording density or the density of the pixels in the sub-scanning direction is 600 dpi.

Accordingly, in the present embodiment, the laser beam detectors P1 and P2 are attached to the locations having the correlation, in which the difference $\delta y$ in the amount of change in the sub-scanning direction detected by the laser beam detectors P1 and P2 and the amount of change in the sub-scanning direction on the surface to be scanned is equal to or less than the density of pixels in the sub-scanning direction. Hence, by driving, for example, the liquid crystal deflection element 16 based on a detection value of the amount of change of the position in the sub-scanning direction to deflect the laser beam so as to perform correction of the position in the sub-scanning direction, even better correction is possible. Here, when the difference $\delta y$ of the amounts of changes of the positions in the sub-scanning direction is more than the density of pixels in the sub-scanning direction, the pixels in the sub-scanning direction of the scanning line are overlapped and thereby, the color shift in the sub-scanning direction becomes large. In order to set the pitch interval in the sub-scanning direction to be equal to or less than 20 μm, which is difficult to be recognized visually, so as to reduce the color shift, it is more preferable that the difference $\delta y$ in the amounts of changes of the positions in the sub-scanning direction be equal to or less than ½ of the density of pixels in the sub-scanning direction.

Here, "$\delta y$" in FIG. 3 indicates the maximum difference in detection values or the amounts of changes of the positions in the sub-scanning direction. Although the maximum difference of the detection values is indicated at the time when the elapse of time is maximum in FIG. 3, it is to be noted that this is an example for the sake of convenience of explanation. The difference of the detection values may become maximum even while in the middle of the elapse of time.

Referring to FIG. 2, each of the laser beam detectors P1 and P2 is disposed outside of the image region in the main-scanning direction, and at least a part D of the light-receiving element of each of the laser beam detectors P1 and P2, as a region for detecting the laser beam L, is arranged inside of an area away from an end of the image region at a predetermined amount, for example, 10 mm. For example, when, at least, the part D is disposed more than 10 mm outside of the area from the end of the image region, optical characteristics such as a field curvature, an error in magnification and so on of the scanning imaging elements, the scanning lenses 9a and 9b for example, are reduced, and the diameter of the laser beam L, which enters each of the light-receiving elements, as well as a variation in scanning time are increased. Thereby, the accuracy in the detection by the laser beam detectors P1 and P2 is deteriorated.

It is more preferable that the above-described area of 10 mm be equal to or less than 5 mm, in order to improve the accuracy of the detection by the laser beam detectors P1 and P2. In the present embodiment, a temperature fluctuation for the magnification error in the main-scanning direction by the scanning imaging elements in the above-described area of 10 mm is set to be equal to or less than other regions including the image region. As will be described later in detail, in the present embodiment, the position of the scanning line in the sub-scanning direction is detected based on a time interval of the scanning in the main-scanning direction. Therefore, a magnification error variation, for example a change with time due to the temperature fluctuation in particular, in the main-scanning direction directly influences the detection accuracy of the laser beam detectors P1 and P2. Hence, a linkage of the accuracy between the image region and the detection region is reversed causing a problem, when the laser beam detectors P1 and P2 are set in the region in which the magnification error variation is larger than that in the image region. In other words, the laser beam detectors P1 and P2 may recognize the magnification error variation as abnormal when the magnification error variation in the detection region or the part D is larger than that of the image region, even if the magnification error variation is small in the image region.

On the other hand, when the scanning imaging elements are designed such that the optical characteristics do not deteriorate even when, the positions at which the laser beam detectors P1 and P2 are set, or at least the parts D of each of the laser beam detectors P1 and P2, are disposed more than 10 mm outside of the area from the end of the image region, this causes the scanning lenses 9a and 9b and the housing 11 for example to be large in size, and incurring rise in costs.

Figure 4:
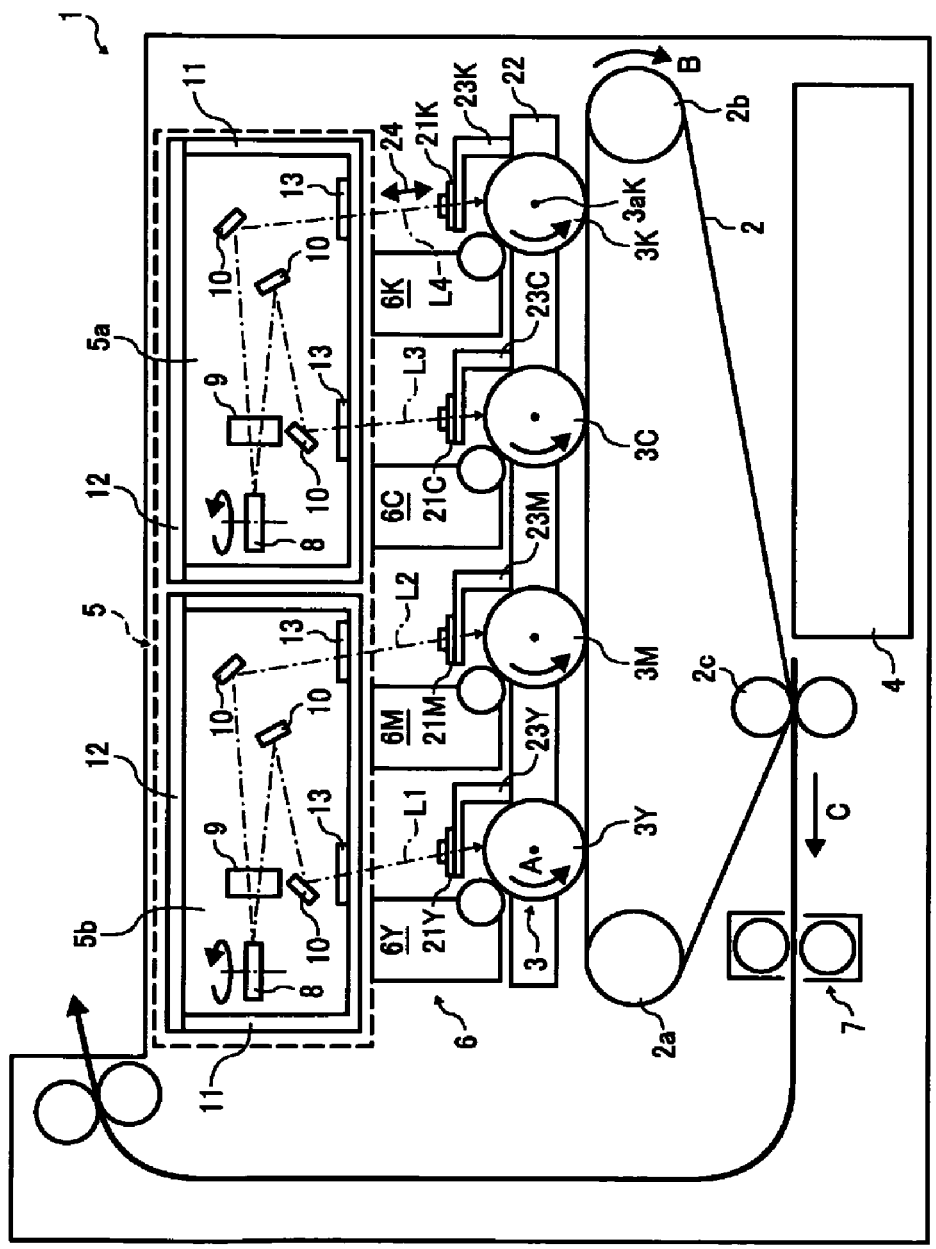
FIG. 4 illustrates a structure of an image forming apparatus mounted with an optical scanning apparatus according to a second embodiment of the present invention.

FIG. 4 illustrates a structure of an image forming apparatus mounted with an optical scanning apparatus according to a second embodiment of the present invention. In the second embodiment, members which are the same or similar to the members already described in the first embodiment are attached with the same reference numerals and explanation thereof will not be provided in detail. The second embodiment mainly describes parts which are different from the first embodiment.

In the present second embodiment, a laser beam detector 21k is not fixed to the optical housing 11 unlike the above-described first embodiment, but is fixed on a side of photoreceptor drums 3Y, 3M, 3C, and 3K which are the surfaces to be scanned. Hereinafter, description of a structure of the laser beam detector 21k will be made in detail by referring to the photoreceptor drum 3K, which corresponds to the black color K, as an example. It is to be noted that structures which are in the periphery of the photoreceptor drums 3Y, 3M, and 3C corresponding to other colors are also similar thereto.

Referring to FIG. 4, a rotational shaft 3aK of the photoreceptor drum 3K is fixed to a single stay member 22, and a bracket member 23K is integrally fixed to the stay member 22 and extends from the stay member 22. In other words, the photoreceptor drum 3K and the laser beam detector 21K are fixed to the stay member 22, in which the stay member 22 is a base member. The laser beam detector 21K is fixed to the bracket member 23K. In the present embodiment, the laser beam detector 21K is arranged outside of the image region for the main-scanning direction, and is arranged on an optical path and within a distance from the surface to be scanned in which a diameter of a beam spot ($1/e^2$ of a peak light amount), which images on the surface to be scanned, becomes 5 times or less, for a direction of an optical axis represented by an arrow 24. Here, it is most preferable that the laser beam detector 21K be arranged at a location equivalent to the surface to be scanned. However, the photoreceptor drum 3K and its surroundings are provided with the electrification charger, the developing device and so on, by which freedom of layout is low. Therefore, it is preferable that the photoreceptor drum 3K be arranged between the dust-proof glass 13 and the surface to be scanned.

According to the present embodiment, the laser beam L, which scans the laser beam detector 21K and the surface to be scanned located within the image region, travels through the same optical elements as a transmission and/or reflective laser beam, and the laser beam detector 21K is fixed to a part where the influence of the deformation of the optical housing 11 does not occur. Therefore, the correlation in the amount of change of the position in the sub-scanning direction on the surface to be scanned and the amount of change of the position in the sub-scanning direction detected by the laser beam detectors P1 and P2 is higher than that of the first embodiment, which means that the difference δy in the amounts of changes in the positions in the sub-scanning direction is less, and hence, the detection of the position in the sub-scanning direction by the laser beam detectors P1 and P2 is possible with higher accuracy.

In such a case, however, the correlation may be deteriorated when a position of a part to which the laser beam detector 21K is attached is varied differently from that of the surface to be scanned or the photoreceptor drum. Accordingly, in the present embodiment, the laser beam detectors 21Y, 21M, 21C, and 21K are fixed to the bracket members 23Y, 23M, 23C, and 23K which extend from the single stay member 22 to which the plurality of photoreceptor drums 3Y, 3M, 3C, and 3K are fixed, so as to avoid the correlation to be deteriorated in each of the respective photoreceptor drums 3Y, 3M, 3C, and 3K and the respective laser beam detectors 21Y, 21M, 21C, and 21K.

Here, for example, in a case where a structure is employed in which the laser beam for the surface to be scanned and the laser beam detectors do not go through the same optical elements or a same optical system, it can be considered, for example, to provide a beam detection optical system separately from the scanning optical system, and to guide the laser beam, via the reflecting mirror, toward the laser beam detectors, in order to prioritize miniaturization of the optical housing 11 and the freedom of layout. However, by doing so, the posture of attachment of the reflecting mirror arranged before the laser beam detectors is changed together with the deformation of the optical housing 11. Thus, even when there is no change in the position in the sub-scanning direction on the surface to be scanned, there may be a problem that the laser beam detectors detect that the position in the sub-scanning direction of the laser beam is changed, due to the change in the posture of the attachment of the reflecting mirror, in particular, in the sub-scanning direction.

Figure 5:
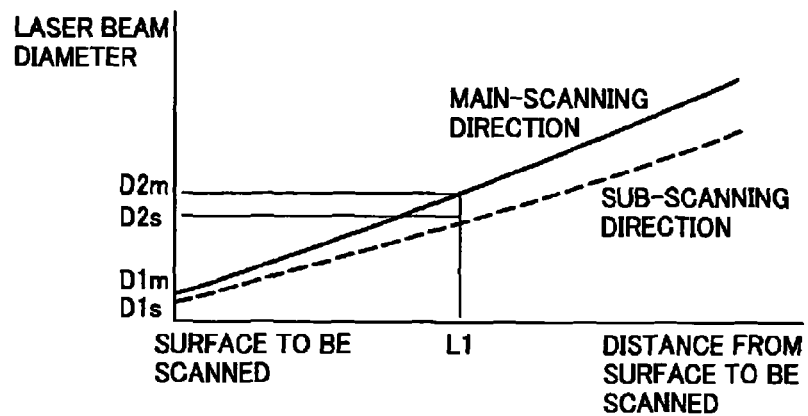
FIG. 5 is a diagram illustrating a relationship between a laser beam diameter and a distance from the surface to be scanned according to the embodiments.

FIG. 5 illustrates a relationship between the laser beam diameter and the distance from the surface to be scanned, for explaining the positions at which the laser beam detectors are set in the first and second embodiments. Referring to FIG. 5, the diameter of the laser beam in an imaging surface or the surface to be scanned is narrowed at the most in a left end part (position of the surface to be scanned) in FIG. 5, and the laser beam diameter becomes gradually larger as the distance from the left end part corresponding to the surface to be scanned in FIG. 5 is increased or is separated away therefrom. In FIG. 5, $D1m$ represents the laser beam diameter for the main-scanning direction, and $D1s$ represents the laser beam diameter for the sub-scanning direction. The accuracy in the detection by the laser beam detectors deteriorates by the increase in the laser beam diameter. Therefore, according to the present embodiment, each of the laser beam detectors is arranged within the distance from the surface to be scanned in which the laser beam diameter in the imaging surface becomes 5 times or less, i.e., $D2m \leq D1m \times 5$ for the diameter of the main-scanning direction, and $D2s \leq D1s \times 5$ for the diameter of the sub-scanning direction. In other words, the positions at which the laser beam detectors are set are located nearer to the surface to be scanned than or including a limit position, where the laser beam diameter becomes 5 times of the laser beam diameters $D1m$ and $D1s$ in the imaging surface or the surface to be scanned.

More specifically, when the diameters of both of the laser beam diameter in the main-scanning direction and the laser beam diameter in the sub-scanning direction in the imaging surface or the surface to be scanned are equal to or less than 80 µm for example, which is nonproblematic in terms of an image, the diameter of the laser beam diameter will be 400 µm, as the diameter having 5 times larger than those in the imaging surface. Therefore, the position at which the laser beam diameter becomes 400 µm is set as the limit position.

Figure 6A:
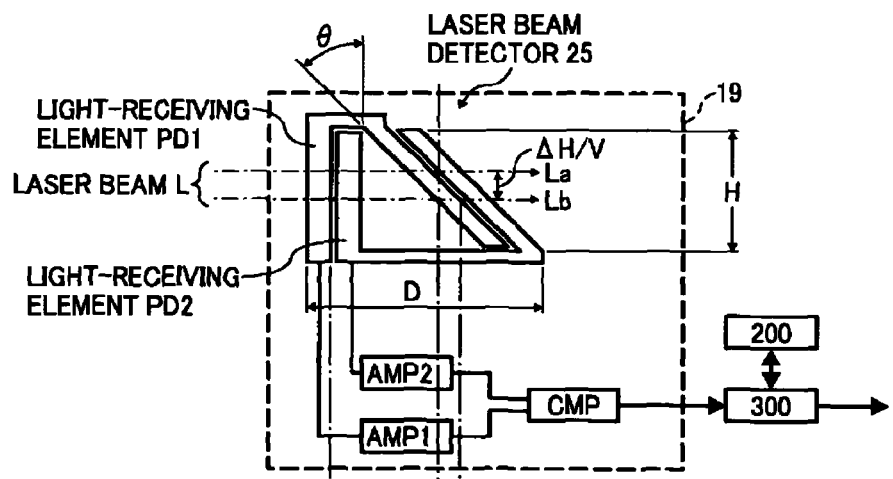
FIGS. 6A to 6D explain a structure of the laser beam detector and detection signals according to the embodiments.

However, when the laser beam detector is set at a position in which the laser beam diameter exceeds 400 µm for example, a width in the main-scanning direction of the laser beam detectors, denoted as D in FIG. 6A which will be described later in detail, and an effective detection height in the sub-scanning direction, denoted as H in FIG. 6A, are forced to be enlarged for 400 µm, i.e., ±200 µm for each of the main and sub-scanning directions, respectively. As a result, desired values for the maximum element width D, or an entire width in the main-scanning direction, and for the effective detection height H in the sub-scanning direction, which are described later in detail, cannot be fulfilled. Hence, a size of a light-receiving surface of the laser beam detector becomes large due to the enlargement of the entire width in the main-scanning direction and the effective detection height H in the sub-scanning direction, and thus, the laser beam detector cannot be easily accommodated within an IC (Integrated Circuit) package. Even when a structure is employed in which the package is omitted, it is necessary to provide a special encapsulation mechanism for protection against oxidation, ensuring air-tightness or the like, which causes rise in costs.

A reference sign L1 represents the distance from the surface to be scanned when the laser beam diameter becomes 5 times for both the main-scanning direction and the sub-scanning direction. For example, there may be a case where the distance, in which the laser beam diameter becomes 5 times, becomes different for the main-scanning direction and the sub-scanning direction, due to a difference in optical systems. In such a case, it is preferable that the distance be set for the shorter distance.

FIGS. 6A to 6D explain a structure of the laser beam detector and detection signals according to the embodiments.

Figure 6B:
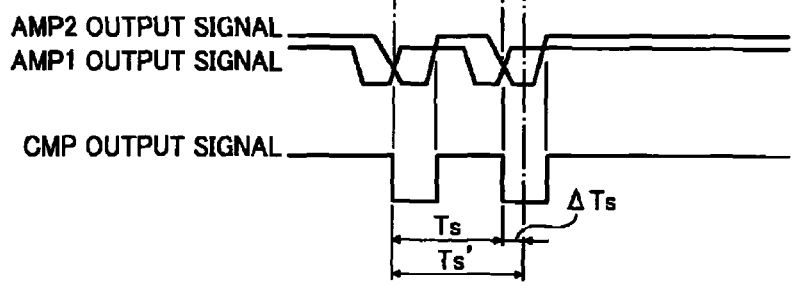

FIG. 6A illustrates the structure of the laser beam detector, and FIG. 6B illustrates output waveforms of the laser beam detector.

Referring to FIG. 6A, a laser beam detector 25, a first system light-receiving element PD1, a second system light-receiving element PD2, the maximum element width D or the entire width in the main-scanning direction, the effective detection height H in the sub-scanning direction, an angle θ of an inclined side of the light-receiving elements, the amplifiers AMP1 and AMP2, and a comparator CMP, are illustrated.

In FIG. 6A, the first system light-receiving element PD1 and the second system light-receiving element PD2 are arranged adjacently in the main-scanning direction. Each of the first system light-receiving element PD1 and the second system light-receiving element PD2 has two light-receiving regions which are divided and formed to be non-parallel to each other in an area in which the laser beam L passes. The respective light-receiving regions are disposed adjacently for the first system light-receiving element PD1 and the second system light-receiving element PD2, and end edge parts thereof which are adjacent to each other are formed in parallel and linearly, mutually. An angle between the two light-receiving regions of each of the light-receiving elements has the angle θ (0<θ<90 degrees) to be arranged. It is preferable that the angle θ be 30 degrees to 60 degrees, for example.

FIG. 6A illustrates an example in which the angle θ is 45 degrees, which is the most preferred. Here, for example, when the angle θ is less than 30 degrees, a variation in a time interval Ts with respect to the scanned laser beam L becomes small relatively, and thereby, sensitivity of detection by the laser beam detector 25 deteriorates. On the other hand, when the angle θ exceeds 60 degrees for example, the effective detection height H in the sub-scanning direction with respect to the entire width D of the light-receiving surface in the main-scanning direction becomes small. Thus, the entire width D of the light-receiving surface is enlarged in order to ensure the necessary effective detection height H, and thereby, the light-receiving surface becomes long in the main-scanning direction, causing a problem in which the light-receiving surface enters inside of the image region. Alternatively, it is necessary to set an effective region of the scanning optical system wide, causing a problem in which scanning lenses are elongated.

The height H in the sub-scanning direction can be set at 1-3 mm, and the entire width D of the light-receiving surface can be set equal to or less than 5 mm, which are suitable in that they do not generate the problems described above. In addition, the values for the height H and the entire width D are possible to be allocated in a balanced manner when the angle θ is 45 degrees, which is preferable in that the above-described problems are tolerable.

In the present embodiment, one of the two light-receiving regions is formed perpendicular to the scanning direction of the laser beam, since timing of an output of the sensors does not change even when the laser beam is deviated in the sub-scanning direction, i.e., in the height H direction in the sub-scanning direction. Thus, it is preferable in order to obtain the horizontal synchronization signal for determining the timing of writing the image in the main-scanning direction.

The output signal of the light-receiving element PD1 is applied with current-voltage conversion and voltage amplification by the amplifier AMP1, whereas the output signal of the light-receiving element PD2 is applied with current-voltage conversion and voltage amplification by the amplifier AMP2. Then, the output signals are subjected to a voltage comparison by the comparator CMP, which outputs a signal when a level of the output signal of the amplifier AMP2 becomes lower than a level of the output signal of the amplifier AMP1. Accordingly, a cross-point of the amplifier AMP1 and the amplifier AMP2 is detected, so that the high-accuracy detection, in which accuracy of detection is not influenced even when the light amount of the laser beam is changed, becomes possible. Thus, an interval between the adjacent first system light-receiving element PD1 and the second system light-receiving element PD2, as the two systems, is set to be smaller than the laser beam diameter which passes therethrough.

FIG. 6B is a timing chart representing the output signals of the laser beam detector 25 when the laser beam L passes the light-receiving elements PD1 and PD2. Referring to FIG. 6B, two pulses are outputted by the passing of the laser beam L, and the time interval Ts from a falling edge to a falling edge of the two pulses depends on the position of the sub-scanning direction (i.e., the height H direction) in which the laser beam L is scanned. For example, when a position of a laser beam La of the laser beam L is changed to a position of a laser beam Lb, in which the time interval in the laser beam La is $T_S$, the time interval in the laser beam Lb becomes $T_S'$, and thus a difference in the time intervals $\Delta T_S$ is $$\Delta T_S = T_S' - T_S$$

Therefore, the amount of change $\Delta h$ of the position in the sub-scanning direction of the laser beam at the time when the position of the laser beam La of the laser beam L is changed to the position of the laser beam Lb is possible to be obtained from a following formula (1):

$$\Delta h = (v \times \Delta Ts)/\tan\theta \qquad (1)$$

where v represents a speed of the laser beam scanned.

For example, when a structure is employed in which a plurality of laser beams is simultaneously scanned with one surface of the polygon mirror, such as a structure of a multi-beam light source unit having the plural laser beams for one light source unit, the arbitrary one of the laser beams is scanned as a target of the detection only when the laser beam detectors are scanned, and the other laser beams of the laser beams are reduced to the extent that they are not detected or are quenched only at that time, such that the arbitrary one of the laser beams is scanned as the target of the detection only when the laser beam detectors are scanned. Such a structure is employed since, if the plural laser beams scan the light-receiving parts of the laser beam detectors, a result which is outputted based on the detection values by the laser beam detectors becomes erroneous.

An error or a variation is generated in the above-described time interval, since a plane tilt, a jitter component or the like exists in the actual polygon mirror. The embodiments take the following measures to avoid deterioration in the detection accuracy by the error component.

Figure 6C:
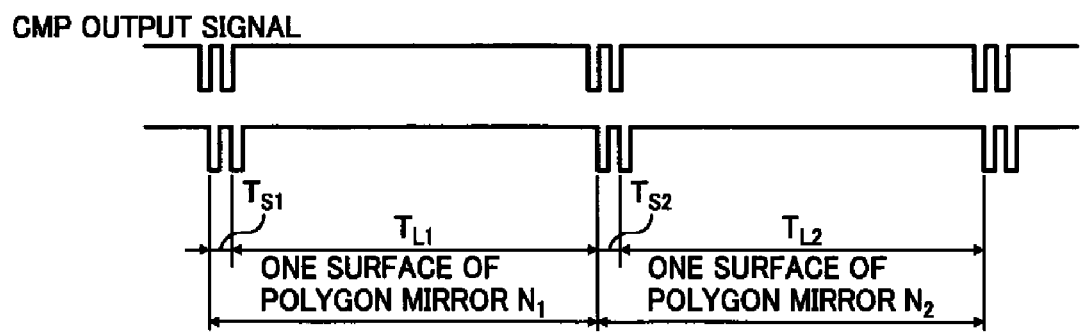

FIG. 6C represents a part of the output signal of the comparator CMP obtained from the polygon mirror which continuously rotates. For the time interval, there are the time interval of $T_S$ from the light-receiving element PD1 to the light-receiving element PD2 when the laser beam scans within the laser beam detector, and a time interval of $T_L$ from the light-receiving element PD2 to the light-receiving element PD1 scanned with the subsequent surface of the polygon mirror. A proportion of the time intervals $T_S$ and $T_L$ is determined, for example, based on a scanning width and the number of rotations or a scanning speed of the polygon mirror, for example, $T_S:T_L=1:200\text{-}400$, which is a significant proportion.

Figure 6D:
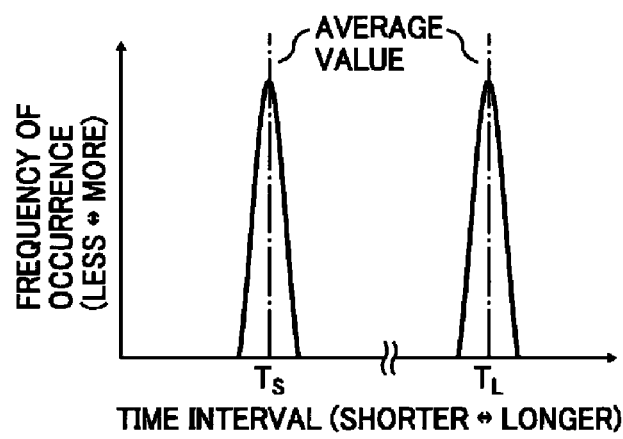

FIG. 6D is a graph on the above-described time intervals. In the present embodiments, a plurality of measurement data on the time intervals $T_S$ and $T_L$ is sequentially stored in a storing device 200, which is then divided into two groups of time intervals $T_S$ and $T_L$, and an average value of the shorter time intervals $T_S$ is determined as the position in the sub-scanning direction of the laser beam, in order to reduce an influence of a variation of the time intervals by the polygon mirror. As a method for separating the shorter time intervals $T_S$, which is performed by a controller 300, an intermediate time interval of $T_S$ and $T_L$ is calculated to filter the time intervals $T_S$ and $T_L$, since there is a large difference in the intervals of the two groups.

However, there is a possibility that the accuracy in the detection of the position in the sub-scanning direction is deteriorated when only a particular surface of the polygon mirror is measured. Thus, it is preferable that the time interval of the entire circumferential surface of the polygon mirror be adopted as the measurement data, as in the embodiments. More specifically, for example, when only one of the surfaces of the polygon mirror largely differs from other surfaces in terms of the plane tilt, a flaw, a hit mark and so forth on the mirror surface, and flatness on the mirror surface to the extent in which the image is not influenced thereby, such a surface having the difference influences the output signals from the laser beam detectors, and may deteriorate the accuracy of detecting the position in the sub-scanning direction.

It is also preferable that the number of measurement samples of the time intervals be as much as possible, in consideration of the variation component, although this requires time for the detection as a side-effect. Therefore, it is advantageous that the number of measurement samples for the time intervals be equal to or less than the number of scannings within a non-image formation time or an interval between pages of printing. The non-image formation time, for example, is the time between image formation, i.e., time in which light-emission of the light source of the optical scanning apparatus is controlled based on the image signal, and the subsequent image formation, i.e., the image formation of the next page.

Practically, it is preferable that the number of samples for averaging the above-described time intervals $T_S$ be about 100-500, for example. It is also advantageous when the number of samples is set to be a multiple of an odd number of the number of mirror surfaces of the polygon mirror, since the number of samples is two, i.e., time intervals $T_S$ and $T_L$, for one surface of the polygon mirror, and the plane tilt and the jitter have a cycle for one rotation, i.e., for the entire circumferential surface, of the polygon mirror.

Figure 7A:
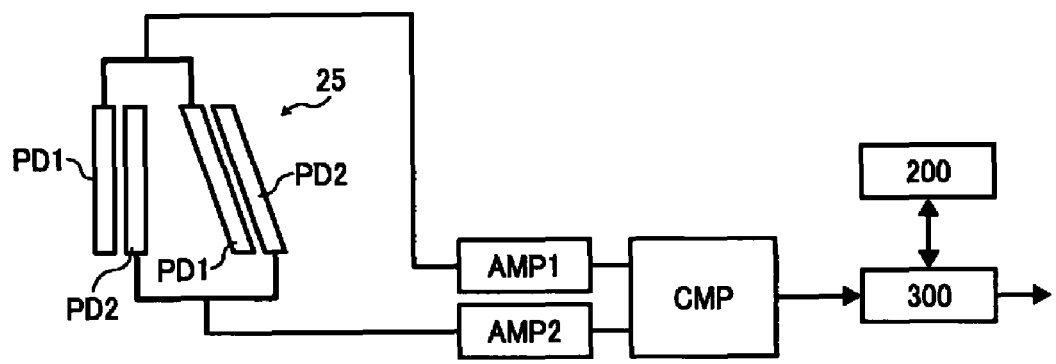
FIGS. 7A and 7B each illustrates another example of the structure of the laser beam detector.
Figure 7B:
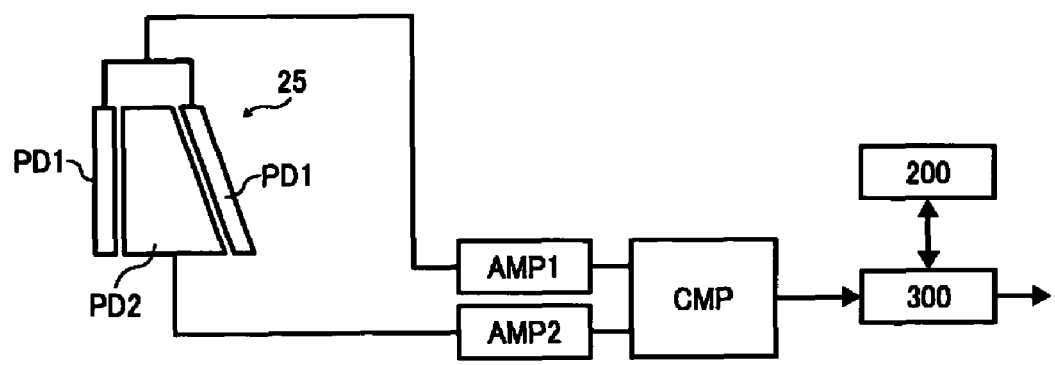

FIGS. 7A and 7B each illustrate another example of the structure of the laser beam detector according to the embodiments. FIG. 7A illustrates the laser beam detector having a structure in which each of the first system light-receiving element PD1 and the second system light-receiving element PD2 is divided into two elements, and forms two light-receiving regions. Each of the light-receiving regions is electrically connected, and is treated as if it is one light-receiving element. Therefore, signal processing the same as that described above with reference to FIGS. 6A to 6D is employed for the laser beam detector illustrated in FIG. 7A.

FIG. 7B illustrates the laser beam detector having a structure in which only the first system light-receiving element PD1 is divided into two elements as in FIG. 7A, which are electrically connected.

Figure 8A:
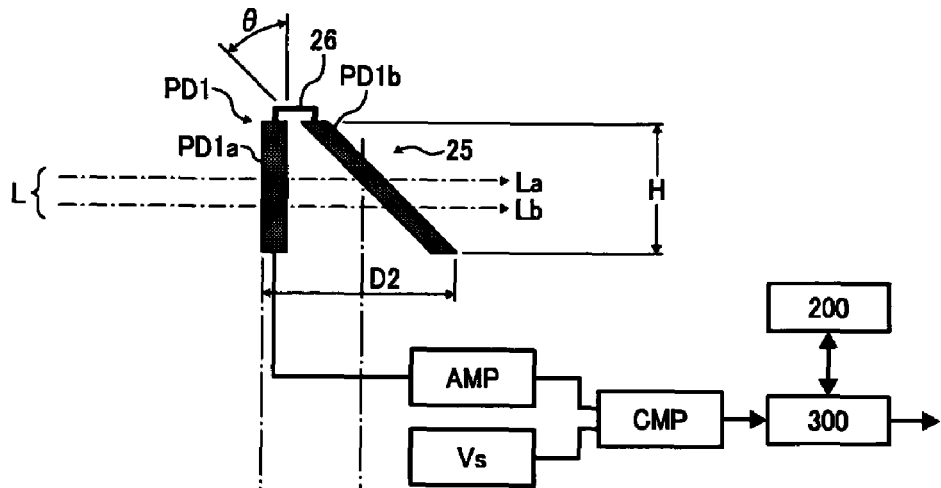
FIGS. 8A and 8B each illustrates yet another example of the structure of the laser beam detector.
Figure 8B:
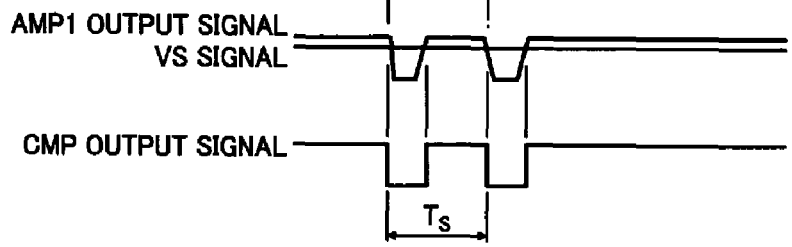

FIGS. 8A and 8B each illustrate yet another example of the structure of the laser beam detector according to the embodiments. As compared with the structure illustrated in FIGS. 6A to 6D, FIGS. 8A and 8B illustrate a structure having only the light-receiving element PD1. The light-receiving element PD1 includes a light-receiving element PD1a and a light-receiving element PD1b, which are electrically connected through a wire bonding 26, as in the light-receiving elements illustrated in FIGS. 6A to 6D. Since the structure illustrated in FIGS. 8A and 8B includes only one light-receiving element PD1, it is possible to have a light-receiving width D2 smaller in size than the structure illustrated in FIGS. 6A to 6D. In addition, the structure illustrated in FIGS. 8A and 8B requires only one amplifier AMP, which is thus less expensive than the structure of FIGS. 6A to 6D. However, the structure of FIGS. 8A and 8B tends to be influenced easily by the fluctuation of the light amount. Therefore, it is desirable that the laser beam, in which the light amount is controlled to be in a constant light amount, be scanned.

In order to detect the amount of change Δh of the position in the sub-scanning direction of the laser beam, the time interval $T_S$ in a reference position of the light-receiving element, through which the laser beam passes, is previously stored in the storing device, for example, at the time before shipment from a factory. Then, the difference $\Delta T_S$ between the time interval $T_S'$ detected by the laser beam detectors and the time interval $T_S$ in the reference position is calculated, and the calculated difference $\Delta T_S$ is assigned in the above formula (1). Thereby, the detection of the amount of change Δh of the position in the sub-scanning direction of the laser beam is possible. The time interval $T_S$ in the reference position is extremely important, in that the time interval $T_S$ in the reference position is used as data on the position in the sub-scanning direction, which is input information of the correction control. Thus, for example, it is preferable that the measurement by the laser beam detectors be performed at least three times with the same measurement method, and in a case in which the data on the position in the sub-scanning direction of one of the measurements differs significantly from that of other measurements, i.e., larger than an addition of an average of the measurements performed at least three times and a standard deviation σ, then that data on the position in the sub-scanning direction is deleted, the measurements are performed again, and the above-described checking is performed again, so as to obtain the reference position.

Based on a result of the detection of the amount of change Δh of the position in the sub-scanning direction of the laser beam, the liquid crystal deflection elements, which are disposed in the optical paths corresponding to the respective colors and having a structure described later in detail, respectively, are driven to perform feedback correction. Thereby, the formation of the color image, in which the color shift is small and having high-image quality, is possible. The feedback correction is performed by driving the liquid crystal deflection elements such that, relative to the change in the position in the sub-scanning direction of the laser beam corresponding to an arbitrary reference color, the positions in the sub-scanning direction of the laser beams of other colors coincide therewith on the intermediate transfer belt, so as to correct the position in the sub-scanning direction.

Alternatively, a reference color may be previously set to delete the liquid crystal deflection element corresponding to the reference color, so as to achieve a reduction of costs. In such a case, it is preferable that a laser transmission member, which is equivalent to transverse magnification of the not-driven liquid crystal deflection element, such as the dust-proof glass 13 illustrated in FIG. 1 for example, be inserted in an optical path.

Figure 9:
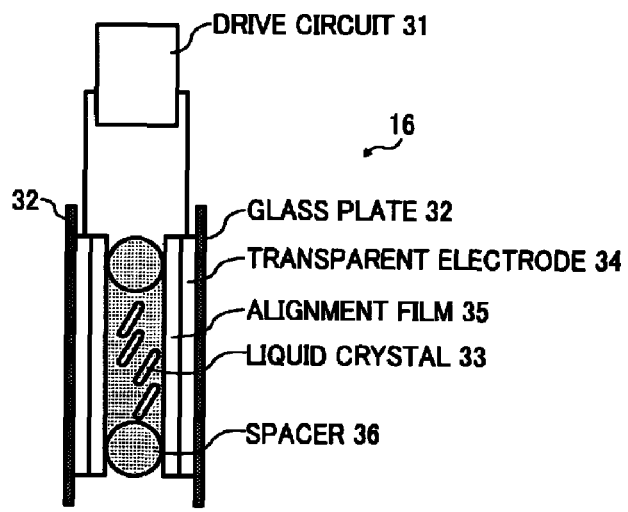
FIG. 9 illustrates a structure of a liquid crystal deflection element used in the embodiments.

FIG. 9 illustrates a structure of the liquid crystal deflection element used in the embodiments. Referring to FIG. 9, a drive circuit 31, glass plates 32, liquid crystals 33, transparent electrodes 34, alignment films 35, and spacers 36 are illustrated.

Figure 10:
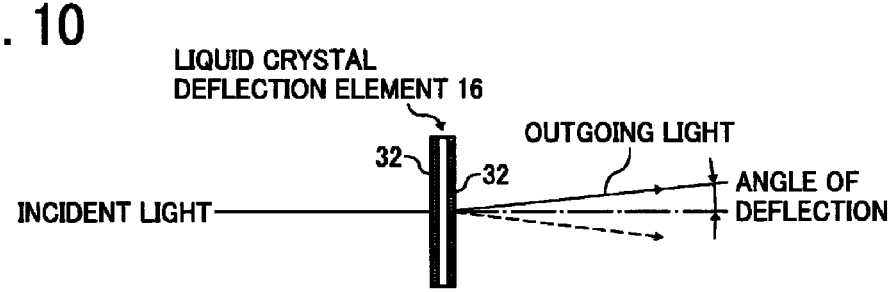
FIG. 10 explains deflection and transmission of a laser beam of the liquid crystal deflection element used in the embodiments.

In FIG. 9, the liquid crystal deflection element 16 deflects the incident laser beam as illustrated in FIG. 10 by applying a rectangular wave voltage with the drive circuit 31, and transmits the laser beam therethrough without deflecting the laser beam when the liquid crystal deflection element 16 is not in operation. An angle of the deflection is variable arbitrarily by controlling a pulse width based on a duty, a peak value, or the like of a drive waveform of the rectangular wave voltage, which will be described later in detail. The liquid crystal deflection element 16 is so disposed that an entire light flux emitted from the light source unit 15 enters the liquid crystal deflection element 16. The liquid crystal deflection element 16 is disposed similarly in a case in which a plurality of light fluxes, such as the plurality of laser beams, is emitted from the light source unit 15.

Figure 12:
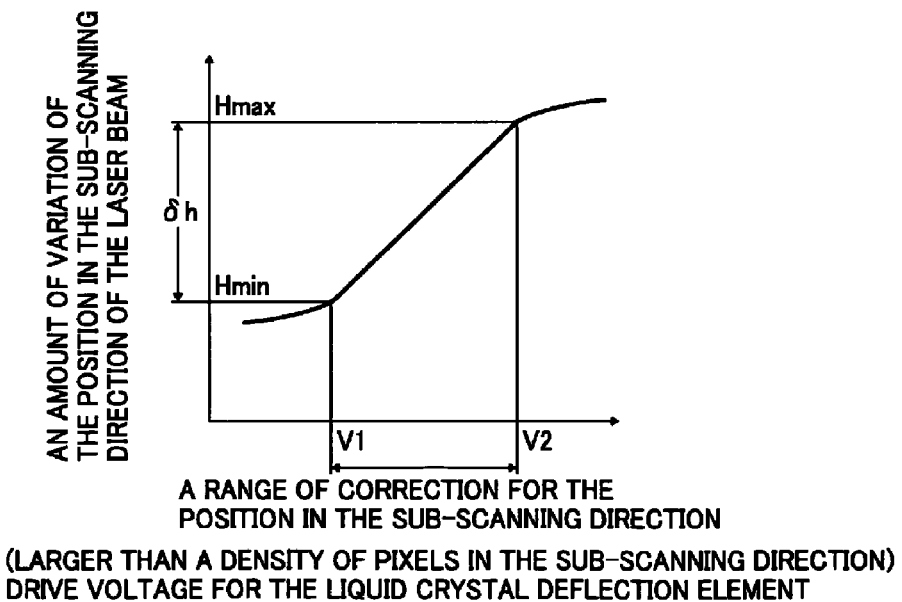
FIG. 12 is a diagram illustrating an amount of variation of a position in a sub-scanning direction of the laser beam to a drive voltage for the liquid crystal deflection element according to the embodiments.

FIG. 12 is a diagram illustrating an amount of variation of the position in the sub-scanning direction of the laser beam relative to the drive voltage to the liquid crystal deflection element according to the embodiments.

The position in the sub-scanning direction does not always vary constantly by a characteristic of the liquid crystal deflection element and change in the drive voltage, but a range in which the sub-scanning position varies constantly is limited. Therefore, according to the present embodiments, the position in the sub-scanning direction of the laser beam is configured to be varied in a range in which a substantially proportional relationship is established, i.e. between V1 and V2 illustrated in FIG. 12, which is simple for a processor to perform a process therefor. The amount of variation δh of the position in the sub-scanning direction of the laser beam in the range between V1 and V2 ensures a range corresponding to the density of pixels in the sub-scanning direction or the pitch interval in the sub-scanning direction at maximum, in order to correct one scanning line corresponding to one surface of the polygon mirror.

To ensure the range corresponding to the density of pixels in the sub-scanning direction, first, it is necessary that the angle of the deflection of the liquid crystal deflection element be large, although this causes problems in terms of a decrease in a response speed for the deflection to be carried out and rise in costs. In this connection, the angle of the deflection of equal to or less than 3 degrees is most preferred in view of the problems. In order to ensure the range corresponding to the density of pixels in the sub-scanning direction with the deflection angle of equal to or less than 3 degrees, it is necessary that magnification of the scanning imaging lens in the sub-scanning direction be equal to or more than 0.7. It is more advantageous with regard to the above-described problems as the magnification in the sub-scanning direction of the scanning imaging lens becomes higher, although, on the other hand, influence on a variation, such as a variation in optical characteristics, size, accuracy in attachment and so forth, of other optical elements, for example, the scanning imaging lens, mirrors and so on, becomes larger. Given this factor, it is preferable that the magnification of the scanning imaging lens in the sub-scanning direction be in a range from 0.7 or more to 1.2 or less. The magnification in the sub-scanning direction of the scanning imaging lens in a range from 0.9 or more to 1.1 or less is most preferred.

Here, the above-described substantially proportional relationship means a relationship in which, the amount of variation δh of the position in the sub-scanning direction of the laser beam in the arbitrary angle within the range from V1 to V2 of the drive voltage is a collinear approximation in a least-square method, and a correlation function r of the collinear approximation becomes equal to or more than 0.8.

In a case in which a change in the characteristic of the liquid crystal deflection element 16 becomes problematic by the temperature variation of the optical housing 11 described above, the drive voltage of the liquid crystal deflection element is adjusted such that the maximum position $H_{max}$ and the minimum position $H_{min}$ of the amount of variation δh of the position in the sub-scanning direction of the laser beam are previously obtained before the control of the correction is performed. Here, the position in the sub-scanning direction is measured by the laser beam detector 5a. Accordingly, a characteristic variation illustrated in FIG. 12 is utilized as a control map so as to obtain the amount of variation δh of the position in the sub-scanning direction of the laser beam (=Δh) from the calculated amount of change Δh of the position in the sub-scanning direction of the laser beam. Then, the drive voltage corresponding to the obtained amount of variation δh of the position in the sub-scanning direction of the laser beam is searched from the control map, and the searched drive voltage is applied to the liquid crystal deflection element. Thereby, the correction of the shift of the position in the sub-scanning direction of the laser beam is possible.

On the other hand, there may be a case where a side-effect, in which a wavefront aberration occurs to deteriorate the beam spot diameter ($1/e^2$ of a peak light amount) on the surface of the photoreceptor drum, is generated by driving the liquid crystal deflection element 16. Therefore, in the present embodiments, an amount of deterioration or an amount of variation of the laser beam diameter is configured to be within ±10% before and after driving of the liquid crystal deflection element 16. This is because, when the deterioration amount of the laser beam diameter is set to be more than ±10%, the detection accuracy of the laser beam detector is worsened and thus a problem occurs, and degradation of an image, i.e., gradation and resolution in particular, is incurred in a case in which the apparatus is used for the image forming apparatus.

In addition, there may be a case in which, by driving the liquid crystal deflection element 16, transmittance of the element is changed, and thereby, the amount of light on the surface of the photoreceptor drum is changed. Therefore, in accordance with the embodiments, an amount of variation of the transmittance of the element, before and after the driving of the liquid crystal deflection element 16, is configured to be within ±1% by transmittance. In a case in which the transmittance is more than ±1%, unevenness of light amount in the scanning direction is increased to influence the image.

Figure 11:
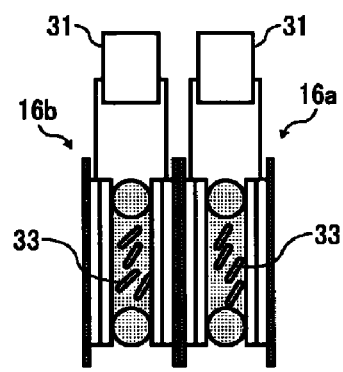
FIG. 11 illustrates another structure of the liquid crystal deflection element.

When the deflection angle obtained with the single liquid crystal deflection element is small and thus the desired deflection angle cannot be obtained, it is preferable to make the deflection angle plural times by overlapping the plurality of liquid crystal deflection elements 16, illustrated in FIG. 9, to be disposed, as illustrated in FIG. 11. FIG. 11 illustrates an example in which two liquid crystal deflection elements 16a and 16b are overlapped to be disposed.

However, only the correction of about two times the density of pixels in the sub-scanning direction at maximum is possible even with the method illustrated in FIG. 11 in which the liquid crystal deflection elements 16a and 16b are overlapped. In a case where an amount of correction of twice or more is demanded, for example, the timing of emission of the laser beam from the light source unit is controlled relative to the driving of the photoreceptor drums (the amount of movement in the sub-scanning direction), such that the desired timing of emission is obtained for the driving of the photoreceptor drums, so as to perform the correction of the shift of the position in the sub-scanning direction of the laser beam. The timing of emission of the light source unit is controlled by a drive circuit 400 illustrated in FIG. 2.

In addition, even in a case in which the timing of emission of the laser beam is controlled, the correction of the position in the sub-scanning direction cannot be performed below the density of pixels in the sub-scanning direction. Therefore, it is preferable that both of the liquid crystal deflection element and the timing of emission be controlled to be driven. For example, when the correction of the position in the sub-scanning direction, in which the amount of correction is 3.4 times the density of pixels in the sub-scanning direction, is demanded, the liquid crystal deflection element and the timing of emission of the laser beam are respectively controlled, such that the correction by the timing of emission is performed for the amount 3 times the density of pixels in the sub-scanning direction and the correction by the liquid crystal deflection element is performed for the amount 0.4 times the density of pixels in the sub-scanning direction.

Figure 13:
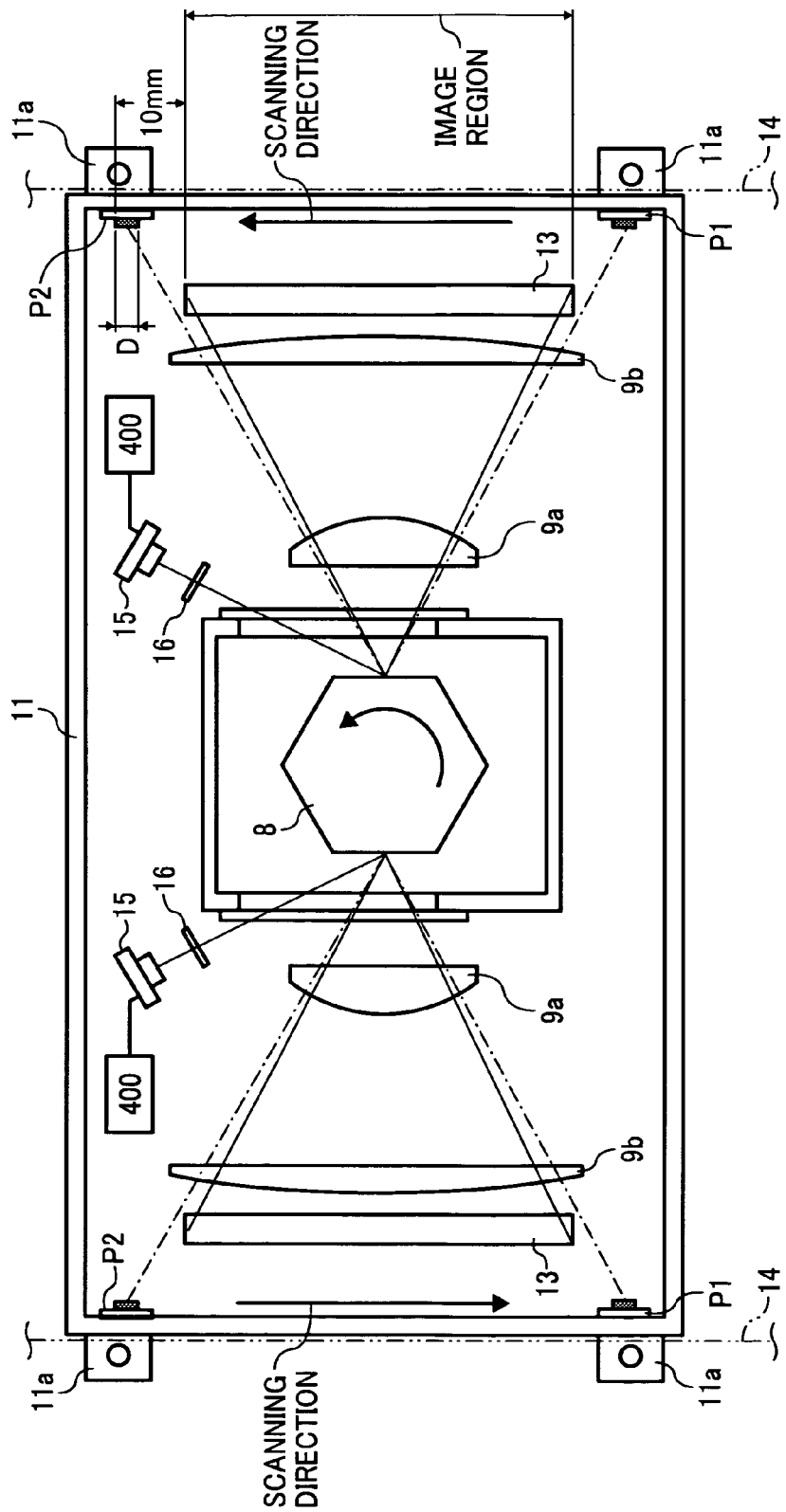
FIG. 13 illustrates a structure of an essential part of an optical scanning apparatus, seen from a plane side, according to a third embodiment of the present invention.

FIG. 13 illustrates a structure of an essential part of an optical scanning apparatus, seen from a plane side, according to a third embodiment of the present invention. In the third embodiment, members which are the same or similar to the members already described in the above embodiments are attached with the same reference numerals and explanation thereof will not be provided in detail.

Referring to FIG. 13, the present third embodiment employs a structure of a so-called opposed scanning type optical system, in which the single polygon mirror 8 is disposed in the center of the optical housing 11 and the laser beams are scanned in the right and left relative to the center of rotation of the polygon mirror 8. The present embodiment is also of a horizontal incident type in which the optical system does not have to be so disposed that the laser beam, which enters the reflecting surface of the polygon mirror 8, has an angle in the sub-scanning direction as in the first embodiment.

Thus, the present third embodiment adopts the optical system type in which the bending of the scanning line of the laser beam, which occurs in principle in an oblique incident type, is not generated. According to this type of the optical system, the amount of deformation of the optical housing 11 at the time of the temperature variation is large as compared with the structure of the first embodiment, since a size of the optical housing 11 according to the present embodiment is increased. However, as described in the first embodiment, the location at which each of the laser beam detectors P1 and P2 is arranged is set behind or on the back surface side of the fixing part 11a, which is in the periphery of the location where the optical housing 11 is attached to be fixed to the frame of the image forming apparatus. The fixing part 11a has the small amount of deformation by the temperature deformation and is located farthest away from the polygon mirror 8 as the source of the heat generation. Therefore, the third embodiment has the correlation of the amounts of changes of the positions in the sub-scanning direction of the laser beams similar to that of the first embodiment, and is also possible to accomplish the detection accuracy equal to or less than the density of pixels in the sub-scanning direction.

Figure 14:
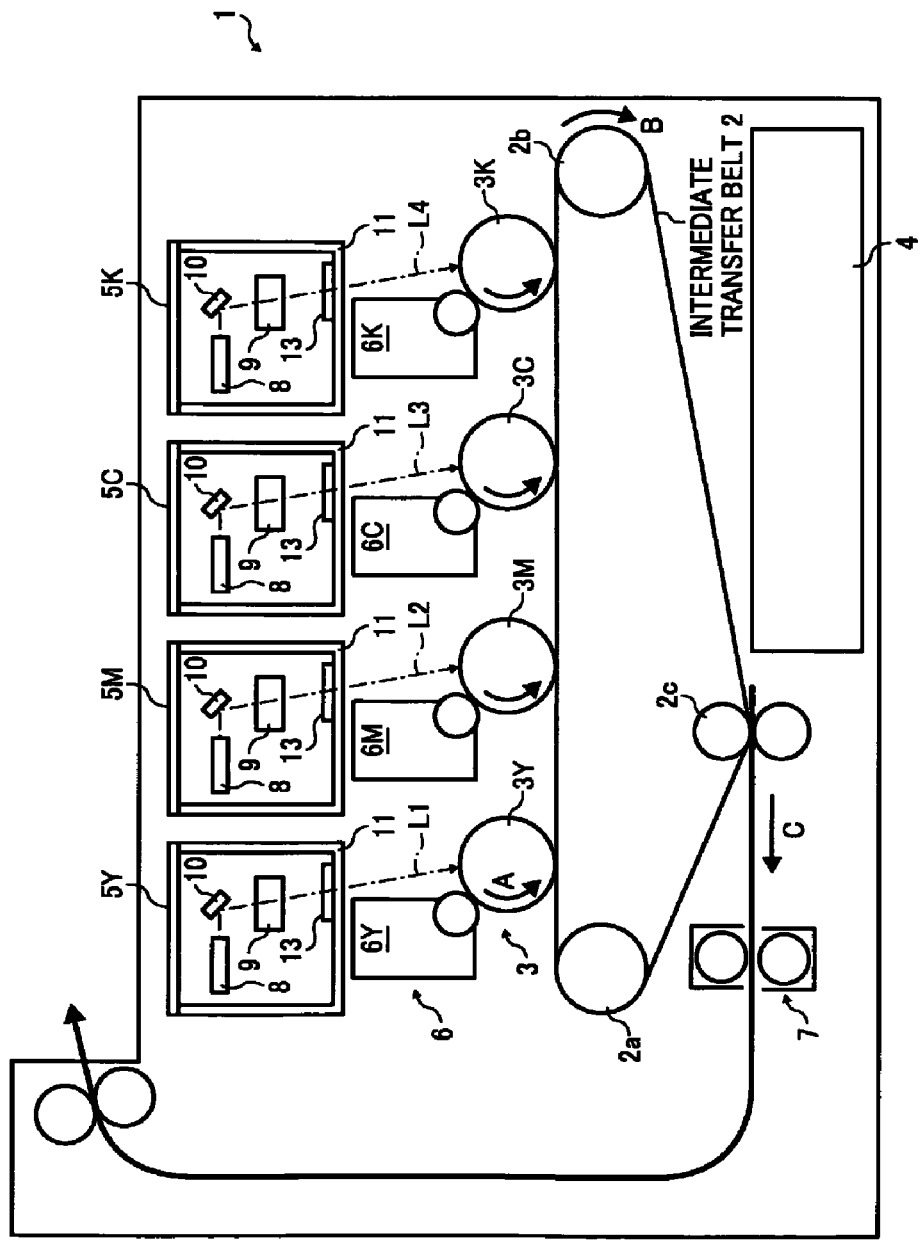
FIG. 14 illustrates a structure of a color image forming apparatus mounted with an optical scanning apparatus according to a fourth embodiment of the present invention.

FIG. 14 illustrates a structure of a color image forming apparatus mounted with an optical scanning apparatus according to a fourth embodiment of the present invention. Referring to FIG. 14, the fourth embodiment utilizes four scanning optical units 5Y, 5M, 3C, and 5K. Each of the scanning optical units 5Y, 5M, 5C, and 5K includes the polygon mirror 8, the optical elements 9, 10 and 13 and so on, all of which are the same components, and which are arranged according to the same layout of the optical path.

In the present fourth embodiment, all the characteristics of the scanning relative to the respective photoreceptor drums 3Y, 3M, 3C, and 3K are the same. Therefore, the variation in deformation of the optical housings 11, caused by the temperature fluctuation, is small, and the correlation between the result of the detection of the positions in the sub-scanning direction of the laser beam detectors and the change in the detection of the positions in the sub-scanning direction of the photoreceptor drums 3Y, 3M, 3C, and 3K as the surfaces to be scanned is high, which means that the difference in the position in the sub-scanning direction detected by the laser beam detectors and the position in the sub-scanning direction on the surface to be scanned is small. Hence, it can be said that the present fourth embodiment has a more suitable structure, which enables the high accuracy detection by the laser beam detectors and thereby realizes high image quality.

Accordingly, it is possible to achieve the following (1) to (18) from the above-described exemplary embodiments of the present invention.

(1) An optical scanning apparatus, comprising:
  a light source unit which emits a light beam;
  a deflection scanning device which deflects the light beam emitted from the light source unit;
  an optical scanning unit having a scanning imaging lens and which scans a surface to be scanned; and
  a light beam detector which detects a position in a sub-scanning direction of the light beam, and is disposed in a position maintaining a correlation, in a time-varying characteristic, between an amount of change of a position in the sub-scanning direction of the light beam on the surface to be scanned and an amount of change of a position in the sub-scanning direction of the light beam detected by the light beam detector, in which a difference between the amount of change of the position in the sub-scanning direction of the light beam on the surface to be scanned and the amount of change of the position in the sub-scanning direction of the light beam detected by the light beam detector is equal to or less than a set value.

According to this structure, the amount of change of the position in the sub-scanning direction detected by the light beam detector substantially coincides with the amount of change of the position in the sub-scanning direction on the surface to be scanned. Therefore, it is possible to detect the amount of change of the position in the sub-scanning direction on the surface to be scanned, as genuine information on the correction for the variation in the position in the sub-scanning direction, with high accuracy.

(2) The optical scanning apparatus according to (1), wherein the difference, in the correlations between the amount of change of the position in the sub-scanning direction of the light beam on the surface to be scanned and the amount of change of the position in the sub-scanning direction of the light beam detected by the light beam detector is equal to or less than a density of pixels in the sub-scanning direction.

According to this structure, the amount of change of the position in the sub-scanning direction detected by the light beam detector substantially coincides with the amount of change of the position in the sub-scanning direction on the surface to be scanned. Therefore, the light beam detector is possible to detect the beam scanning position with high accuracy. Thereby, it is possible to perform better correction of the position in the sub-scanning direction of the laser beam to suppress the generation of the color shift.

(3) The optical scanning apparatus according to (1), further comprising an optical housing provided with an attachment section to which the light beam detector is attached, and accommodating therein at least the deflection scanning device.

(4) The optical scanning apparatus according to (3), wherein the optical housing further comprises a fixing part to which a frame of an apparatus is mounted, and the attachment section is provided in the periphery of the fixing part.

(5) The optical scanning apparatus according to (4), wherein the attachment section is provided behind the fixing part.

(6) The optical scanning apparatus according to (3), wherein an amount of deformation of the attachment section due to a variation in operating temperature is set equal to or less than a density of pixels in the sub-scanning direction.

(7) The optical scanning apparatus according to (6), wherein the variation in the operating temperature includes a rise in temperature in the optical housing due to driving of the deflection scanning device, and the amount of the deformation of the attachment section due to the rise in the temperature is set equal to or less than the density of pixels in the sub-scanning direction.

According to the structure of each of (3) to (7), it is possible to reduce the influence on the result of the detection of the light beam detector, due to the deformation of the optical housing, as much as possible, and to detect the beam scanning position with high accuracy.

(8) The optical scanning apparatus according to (1), wherein the light beam detector is disposed in an optical scanning region outside of an image region, and the light beam which scans the image region and a light-receiving element provided in the light beam detector travels through a same optical element.

According to this structure, it is possible to detect the beam scanning position with higher accuracy.

(9) The optical scanning apparatus according to (1), wherein the light beam detector is disposed on an optical path and within a distance from the surface to be scanned in which a diameter of a light beam spot ($1/e^2$ of a peak light amount) of the light beam, which images on the surface to be scanned, becomes 5 times or less.

According to this structure, it is possible to avoid deterioration of the accuracy in the detection, due to widening of the diameter of the light beam.

(10) The optical scanning apparatus according to (1), wherein the light beam detector includes a light-receiving element having a plurality of light-receiving surfaces which detect the light beam, the plurality of light-receiving surfaces is formed such that end edge parts thereof, which are adjacent in an area in which the light beam passes, are non-parallel mutually, and the plurality of light-receiving surfaces is electrically connected, mutually.

According to this structure, it is possible to detect the beam scanning position with higher accuracy with reduced costs.

(11) The optical scanning apparatus according to (10), wherein the light-receiving element in the light beam detector is scanned by the light beam having a constant amount of light.

According to this structure, the light amount does not influence the detection accuracy of the position in the sub-scanning direction. Therefore, it is possible to perform the detection which is stable and has higher accuracy.

(12) The optical scanning apparatus according to (10), further comprising a controller which sequentially measures time intervals of pulse signals outputted from the light beam detector, sequentially stores the measured time intervals into a storing device, divides the time intervals stored in the storing device into two groups of the time intervals, and calculates the position in the sub-scanning direction of the light beam from an average value of the shorter group of time intervals separated.

According to this structure, the influence by the plane tilt, variation in the jitter and so forth of the deflection scanning device is reduced. Therefore, it is possible to detect the position in the sub-scanning direction of the light beam with higher accuracy.

(13) The optical scanning apparatus according to (1), further comprising a drive circuit which drives a liquid crystal deflection element disposed in an optical path of the light scanning unit to correct the position in the sub-scanning direction of the light beam, based on the amount of change of the position in the sub-scanning direction of the light beam detected by the light beam detector.

According to this structure, the detection will not be influenced by the temperature variation. Therefore, the scanning position of the light beam is stabilized.

(14) The optical scanning apparatus according to (1), further comprising a drive circuit which controls timing of light-emission of the light source unit to correct the position in the sub-scanning direction of the light beam, based on the amount of change of the position in the sub-scanning direction of the light beam detected by the light beam detector.

According to this structure, it is possible to ensure the large amount of correction of the position in the sub-scanning direction.

(15) An optical scanning apparatus, comprising:
   a light source unit which emits a light beam;
   a deflection scanning device which deflects the light beam emitted from the light source unit;
   an optical scanning unit having a scanning imaging lens and which scans a surface to be scanned;
   an optical housing having an inner surface and an outer surface, and provided with a fixing part to which a frame of an apparatus is mounted on the outer surface, the optical housing accommodating in a space surrounded by the inner surface of at least the deflection scanning device; and
   a light beam detector provided on the inner surface in the periphery of the fixing part away from the deflection scanning device, and which detects a position in a sub-scanning direction of the light beam.

According to this structure, the amount of change of the position in the sub-scanning direction detected by the light beam detector substantially coincides with the amount of change of the position in the sub-scanning direction on the surface to be scanned. Therefore, it is possible to detect the amount of change of the position in the sub-scanning direction on the surface to be scanned, as genuine information on the correction for the variation in the position in the sub-scanning direction, with high accuracy.

(16) An image forming apparatus which forms a latent image on a photoreceptor having a surface to be scanned with optical scanning to obtain a desired recording image by visualizing the latent image, the image forming apparatus including the optical scanning apparatus according to any one of (1) to (15).

According to this structure, the image forming apparatus is mounted with the optical scanning apparatus which is capable of detecting the position in the sub-scanning direction of the beam on the surface to be scanned with high accuracy. Therefore, the image forming apparatus, in which the formation of high image quality is performed, is realized.

(17) The image forming apparatus according to (16), wherein the light beam detector and the photoreceptor are fixed and supported by a same supporting member.

(18) The image forming apparatus according to (17), wherein the supporting member includes:
   a single stay member; and
   a bracket member integrally fixed to the stay member and which extends from the stay member,
   and wherein a rotation shaft of the photoreceptor is fixed to the stay member, and the light beam detector is fixed to the bracket member, such that the difference between the amount of change of the position in the sub-scanning direction of the light beam on the surface to be scanned and the amount of change of the position in the sub-scanning direction of the light beam detected by the light beam detector is suppressed to be equal to or less than the density of pixels in the sub-scanning direction.

According to the structure of each of (17) and (18), it is possible to detect the beam scanning position with high accuracy, and to correct the position in the sub-scanning direction based on the result of the high-accuracy detection. Therefore, the formation of the color image having high-image quality in which the color shift is reduced, is realized even in the color image forming apparatus.

Although the present invention has been described in terms of exemplary embodiments, it is not limited thereto. It should be appreciated that variations may be made in the embodiments described by persons skilled in the art without departing from the scope of the present invention as defined by the following claims. The limitations in the claims are to be interpreted broadly based on the language employed in the claims and not limited to examples described in the present specification or during the prosecution of the application, and the examples are to be construed as non-exclusive. For example, in the present disclosure, the term "preferably", "preferred" or the like is non-exclusive and means "preferably", but not limited to. Moreover, no element or component in the present disclosure is intended to be dedicated to the public regardless of whether the element or component is explicitly recited in the following claims.

What is claimed is:

1. An optical scanning apparatus, comprising:
   a light source unit which emits a light beam;
   a deflection scanning device which deflects the light beam emitted from the light source unit;
   an optical scanning unit having a scanning imaging lens and which scans a surface to be scanned; and
   a light beam detector which detects a position in a sub-scanning direction of the light beam, and is disposed in a position maintaining a correlation, in a time-varying characteristic, between an amount of change of a position in the sub-scanning direction of the light beam on the surface to be scanned and an amount of change of a position in the sub-scanning direction of the light beam detected by the light beam detector, in which a difference between the amount of change of the position in the sub-scanning direction of the light beam on the surface to be scanned and the amount of change of the position in the sub-scanning direction of the light beam detected by the light beam detector is equal to or less than a set value.

2. The optical scanning apparatus according to claim 1, wherein the difference, in the correlation, between the amount of change of the position in the sub-scanning direction of the light beam on the surface to be scanned and the amount of change of the position in the sub-scanning direction of the light beam detected by the light beam detector is equal to or less than a density of pixels in the sub-scanning direction.

3. The optical scanning apparatus according to claim 1, further comprising an optical housing provided with an attachment section to which the light beam detector is attached, and accommodating therein at least the deflection scanning device.

4. The optical scanning apparatus according to claim 3, wherein the optical housing further comprises a fixing part to which a frame of an apparatus is mounted, and the attachment section is provided in a periphery of the fixing part.

5. The optical scanning apparatus according to claim 4, wherein the attachment section is provided behind the fixing part.

6. The optical scanning apparatus according to claim 3, wherein an amount of deformation of the attachment section due to a variation in operating temperature is set equal to or less than a density of pixels in the sub-scanning direction.

7. The optical scanning apparatus according to claim 6, wherein the variation in the operating temperature includes a rise in temperature in the optical housing due to driving of the deflection scanning device, and the amount of the deformation of the attachment section due to the rise in the temperature is set equal to or less than the density of pixels in the sub-scanning direction.

8. The optical scanning apparatus according to claim 1, wherein the light beam detector is disposed in an optical scanning region outside of an image region, and the light beam which scans the image region and a light-receiving element provided in the light beam detector travels through a same optical element.

9. The optical scanning apparatus according to claim 1, wherein the light beam detector is disposed on an optical path and within a distance from the surface to be scanned in which a diameter of a light beam spot ($1/e^2$ of a peak light amount) of the light beam, which images on the surface to be scanned, becomes 5 times or less.

10. The optical scanning apparatus according to claim 1, wherein the light beam detector includes a light-receiving element having a plurality of light-receiving surfaces which detect the light beam, the plurality of light-receiving surfaces is formed such that end edge parts thereof, which are adjacent in an area in which the light beam passes, are non-parallel mutually, and the plurality of light-receiving surfaces is electrically connected, mutually.

11. The optical scanning apparatus according to claim 10, wherein the light-receiving element in the light beam detector is scanned by the light beam having a constant amount of light.

12. The optical scanning apparatus according to claim 10, further comprising a controller which sequentially measures time intervals of pulse signals outputted from the light beam detector, sequentially stores the measured time intervals into a storing device, divides the time intervals stored in the storing device into two groups of the time intervals, and calculates the position in the sub-scanning direction of the light beam from an average value of the shorter group of time intervals separated.

13. The optical scanning apparatus according to claim 1, further comprising a drive circuit which drives a liquid crystal deflection element disposed in an optical path of the light scanning unit to correct the position in the sub-scanning direction of the light beam, based on the amount of change of the position in the sub-scanning direction of the light beam detected by the light beam detector.

14. The optical scanning apparatus according to claim 1, further comprising a drive circuit which controls timing of light-emission of the light source unit to correct the position in the sub-scanning direction of the light beam, based on the amount of change of the position in the sub-scanning direction of the light beam detected by the light beam detector.

15. An optical scanning apparatus, comprising:
a light source unit which emits a light beam;
a deflection scanning device which deflects the light beam emitted from the light source unit;
an optical scanning unit having a scanning imaging lens and which scans a surface to be scanned;
an optical housing having an inner surface and an outer surface, and provided with a fixing part to which a frame of an apparatus is mounted on the outer surface, the optical housing accommodating in a space surrounded by the inner surface of at least the deflection scanning device; and
a light beam detector provided on the inner surface in a periphery of the fixing part away from the deflection scanning device, and which detects a position in a sub-scanning direction of the light beam.

16. The optical scanning apparatus according to claim 15, wherein said scanning image lens of said optical scanning unit is located between said deflection scanning device and said light beam detector, and wherein the frame is stiff such that deformation in the fixing part is suppressed, such that detection accuracy of the position of the light beam in the sub-scanning direction is increased.

17. The optical scanning apparatus according to claim 16, further comprising a drive circuit for correcting the position in the sub-scanning direction of the light beam, based on the amount of change of the position in the sub-scanning direction of the light beam detected by the light beam detector.

18. An image forming apparatus which forms a latent image on a photoreceptor having a surface to be scanned with optical scanning to obtain a desired recording image by visualizing the latent image, the image forming apparatus comprising an optical scanning apparatus, including:
a light source unit which emits a light beam;
a deflection scanning device which deflects the light beam emitted from the light source unit;
an optical scanning unit having a scanning imaging lens and which scans the surface to be scanned; and
a light beam detector which detects a position in a sub-scanning direction of the light beam, and is disposed in a position maintaining a correlation, in a time-varying characteristic, between an amount of change of a position in the sub-scanning direction of the light beam on the surface to be scanned and an amount of change of a position in the sub-scanning direction of the light beam detected by the light beam detector, in which a difference between the amount of change of the position in the sub-scanning direction of the light beam on the surface to be scanned and the amount of change of the position in the sub-scanning direction of the light beam detected by the light beam detector is equal to or less than a set value.

19. The image forming apparatus according to claim 18, wherein the light beam detector and the photoreceptor are fixed and supported by a same supporting member.

20. The image forming apparatus according to claim 19, wherein the supporting member includes:
a single stay member; and
a bracket member integrally fixed to the stay member and which extends from the stay member, and
wherein a rotation shaft of the photoreceptor is fixed to the stay member, and the light beam detector is fixed to the bracket member, such that the difference between the amount of change of the position in the sub-scanning direction of the light beam on the surface to be scanned and the amount of change of the position in the sub-scanning direction of the light beam detected by the light beam detector is suppressed to be equal to or less than the density of pixels in the sub-scanning direction.

* * * * *